US012686306B2

(12) United States Patent
Ienaga et al.

(10) Patent No.: US 12,686,306 B2
(45) Date of Patent: Jul. 21, 2026

(54) SEAT PAD AND SEAT PAD MANUFACTURING METHOD

(71) Applicant: Archem Inc., Tokyo (JP)

(72) Inventors: Satoshi Ienaga, Tokyo (JP);
Toshimitsu Shinohara, Tokyo (JP);
Yoshiyuki Takahashi, Tokyo (JP);
Yukiko Yamaguchi, Tokyo (JP)

(73) Assignee: Archem Inc., Tokyo (JP)

( * ) Notice: Subject to any disclaimer, the term of this patent is extended or adjusted under 35 U.S.C. 154(b) by 311 days.

(21) Appl. No.: 18/570,633

(22) PCT Filed: Nov. 5, 2021

(86) PCT No.: PCT/JP2021/040890
§ 371 (c)(1),
(2) Date: Dec. 15, 2023

(87) PCT Pub. No.: WO2022/264447
PCT Pub. Date: Dec. 22, 2022

(65) Prior Publication Data
US 2024/0278700 A1      Aug. 22, 2024

(30) Foreign Application Priority Data

Jun. 15, 2021     (JP) ................................. 2021-099727

(51) Int. Cl.
B60N 2/70 (2006.01)
B33Y 10/00 (2015.01)
B33Y 80/00 (2015.01)

(52) U.S. Cl.
CPC ............ B60N 2/7017 (2013.01); B33Y 10/00 (2014.12); B33Y 80/00 (2014.12)

(58) Field of Classification Search
CPC ........ B60N 2/7017; B33Y 10/00; B33Y 80/00
(Continued)

(56) References Cited

U.S. PATENT DOCUMENTS 10,343,565 B2 * 7/2019 Baek .................... B60N 2/7017
2019/0184866 A1 6/2019 Tamaki et al.
(Continued)

FOREIGN PATENT DOCUMENTS

DE      102017118157 A1 *  2/2018  ............... B60N 2/62
EP           3292795 A1 *  3/2018  ......... C08G 18/4238
(Continued)

OTHER PUBLICATIONS

Dec. 14, 2023, International Preliminary Report on Patentability issued in the International Patent Application No. PCT/JP2021/040890.
(Continued)

*Primary Examiner* — Jose V Chen
(74) *Attorney, Agent, or Firm* — KENJA IP LAW PC

(57) ABSTRACT

A seat pad (302) includes a fitting member (51) having a fitting portion (510) and a fitted member (52) having a fitted portion (520) configured to be fitted with the fitting portion, wherein the fitting member and the fitted member are each constituted of a porous structural body (1), the porous structural body is made of a flexible resin or rubber, the porous structural body (1) includes a skeleton part (2) over almost the entirety of the porous structural body, and the skeleton part includes a plurality of bone parts (2B) and a plurality of connection parts (2J) each configured to connect ends of the plurality of bone parts.

21 Claims, 24 Drawing Sheets

(58) Field of Classification Search
    USPC ...................................................... 297/452.48
    See application file for complete search history.

(56)                    References Cited

U.S. PATENT DOCUMENTS

| | | | |
|---|---|---|---|
| 2022/0041084 A1 | 2/2022 | Itabashi et al. | |
| 2022/0055266 A1 * | 2/2022 | Iizuka | B29D 99/0092 |
| 2022/0153175 A1 | 5/2022 | Itabashi et al. | |
| 2023/0294578 A1 * | 9/2023 | Takahashi | B29C 64/00 |
| | | | 428/118 |
| 2023/0363547 A1 * | 11/2023 | Shinohara | B29C 64/129 |

FOREIGN PATENT DOCUMENTS

| | | | | | |
|---|---|---|---|---|---|
| EP | 3892162 | A1 * | 10/2021 | ......... | B29D 99/0092 |
| EP | 3892163 | A1 * | 10/2021 | .......... | B60N 2/5891 |
| JP | H0741491 | Y2 | 9/1995 | | |
| JP | H0824068 | A | 1/1996 | | |
| JP | H09271423 | A | 10/1997 | | |
| JP | 2005152158 | A * | 6/2005 | .......... | B60N 2/0033 |
| JP | 2008279897 | A | 11/2008 | | |
| JP | 2013189519 | A | 9/2013 | | |
| JP | 2017100518 | A | 6/2017 | | |
| JP | 2019210448 | A * | 12/2019 | | |
| JP | 6633174 | B1 * | 1/2020 | | |
| JP | 6691951 | B2 * | 5/2020 | | |
| JP | 2020172076 | A | 10/2020 | | |
| JP | 2020172211 | A * | 10/2020 | ............ | B33Y 70/00 |
| JP | 2020189931 | A * | 11/2020 | | |
| JP | 7258652 | B2 * | 4/2023 | | |
| JP | 7389025 | B2 * | 11/2023 | ............ | B33Y 80/00 |
| WO | 2019235544 | A1 | 12/2019 | | |
| WO | 2019235547 | A1 | 12/2019 | | |
| WO | WO-2019235545 | A1 * | 12/2019 | ............ | B33Y 50/00 |
| WO | WO-2019235546 | A1 * | 12/2019 | ............... | C08J 9/00 |
| WO | 2020121644 | A1 | 6/2020 | | |
| WO | WO-2020116329 | A1 * | 6/2020 | .......... | B60N 2/5891 |
| WO | WO-2020208939 | A1 * | 10/2020 | ............ | B33Y 70/00 |

OTHER PUBLICATIONS

Jan. 11, 2022, International Search Report issued in the International Patent Application No. PCT/JP2021/040890.

Jan. 19, 2026, search result of Office Action issued by the China National Intellectual Property Administration in the corresponding Chinese Patent Application No. 202180099344.0.

May 27, 2026, search result of Office Action issued by the China National Intellectual Property Administration in the corresponding Chinese Patent Application No. 202180099344.0.

\* cited by examiner

*FIG. 3*

SECTION B-B

SECTION D-D

SECTION E-E

SECTION F-F

SECTION G-G

TD

LD

A-ARROW VIEW

SEAT PAD AND SEAT PAD MANUFACTURING METHOD

TECHNICAL FIELD

The present disclosure relates to a seat pad and a seat pad manufacturing method.

This application claims priority to Japanese Patent Application No. 2021-099727, filed on Jun. 15, 2021, the entire contents of which are incorporated herein by reference.

BACKGROUND

Conventionally, cushioning porous structural bodies (e.g., urethane foam) are manufactured through a process of foaming by chemical reaction, for example, in mold forming or the like.

On the other hand, in recent years, cushioning porous structural bodies that can be easily manufactured by 3D printers have been proposed (for example, Patent Literatures (PTLs) 1 and 2).

CITATION LIST

Patent Literature

PTL 1: WO 2019/235544
PTL 2: WO 2019/235547

SUMMARY

Technical Problem

The inventors of the present disclosure have diligently studied a seat pad capable of obtaining dynamic properties different from those obtained when the seat pad is constituted of a single member made of a porous structural body as described above, and have arrived at the present disclosure.

It would be helpful to provide a seat pad capable of obtaining dynamic properties different from those obtained when the seat pad is constituted of a single member made of a porous structural body, and a seat pad manufacturing method for obtaining a seat pad capable of obtaining dynamic properties different from those obtained when the seat pad is constituted of a single member made of a porous structural body.

Solution to Problem

A seat pad according to the present disclosure includes:
a fitting member having a fitting portion; and
a fitted member having a fitted portion configured to be fitted with the fitting portion,
wherein
the fitting member and the fitted member are each constituted of a porous structural body,
the porous structural body is made of a flexible resin or rubber,
the porous structural body includes a skeleton part over almost the entirety of the porous structural body, and
the skeleton part includes:
a plurality of bone parts; and
a plurality of connection parts each configured to connect ends of the plurality of bone parts.

A seat pad manufacturing method according to the present disclosure is a seat pad manufacturing method for manufacturing the seat pad described above, the seat pad manufacturing method includes:
shaping the fitting member and the fitted member using a 3D printer; and
fitting the fitting portion of the fitting member and the fitted portion of the fitted member with each other.

Advantageous Effect

According to the present disclosure, it is possible to provide a seat pad capable of obtaining dynamic properties different from those obtained when the seat pad is constituted of a single member made of a porous structural body, and a seat pad manufacturing method for obtaining a seat pad capable of obtaining dynamic properties different from those obtained when the seat pad is constituted of a single member made of a porous structural body.

BRIEF DESCRIPTION OF THE DRAWINGS

In the accompanying drawings:

FIG. 3 is a B-B cross-sectional view that schematically illustrates the seat pad of FIG. 2 in cross-section along the line B-B of FIG. 2 and parallel to a pad extension direction;

FIG. 13 is a pad width-directional cross-sectional view that schematically illustrates the seat pad according to a sixth embodiment of the present disclosure in cross-section along the pad width direction;

Figure 14:
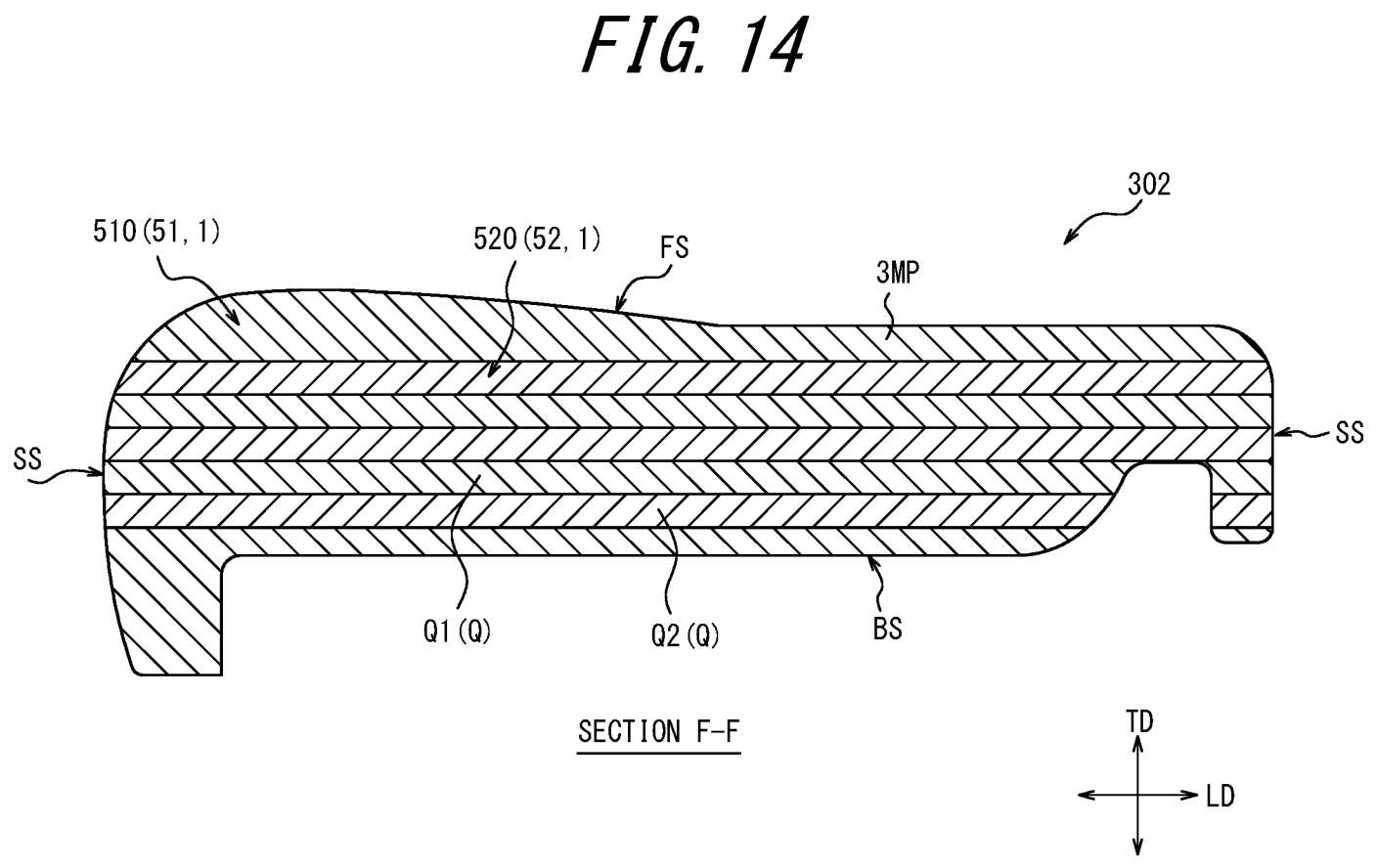

FIG. 14 is an F-F cross-sectional view that schematically illustrates the seat pad of FIG. 13 in cross-section along the line F-F of FIG. 13 and parallel to the pad extension direction;

FIG. 15 is a pad width-directional cross-sectional view that schematically illustrates the seat pad according to a seventh embodiment of the present disclosure in cross-section along the pad width direction;

Figure 16:
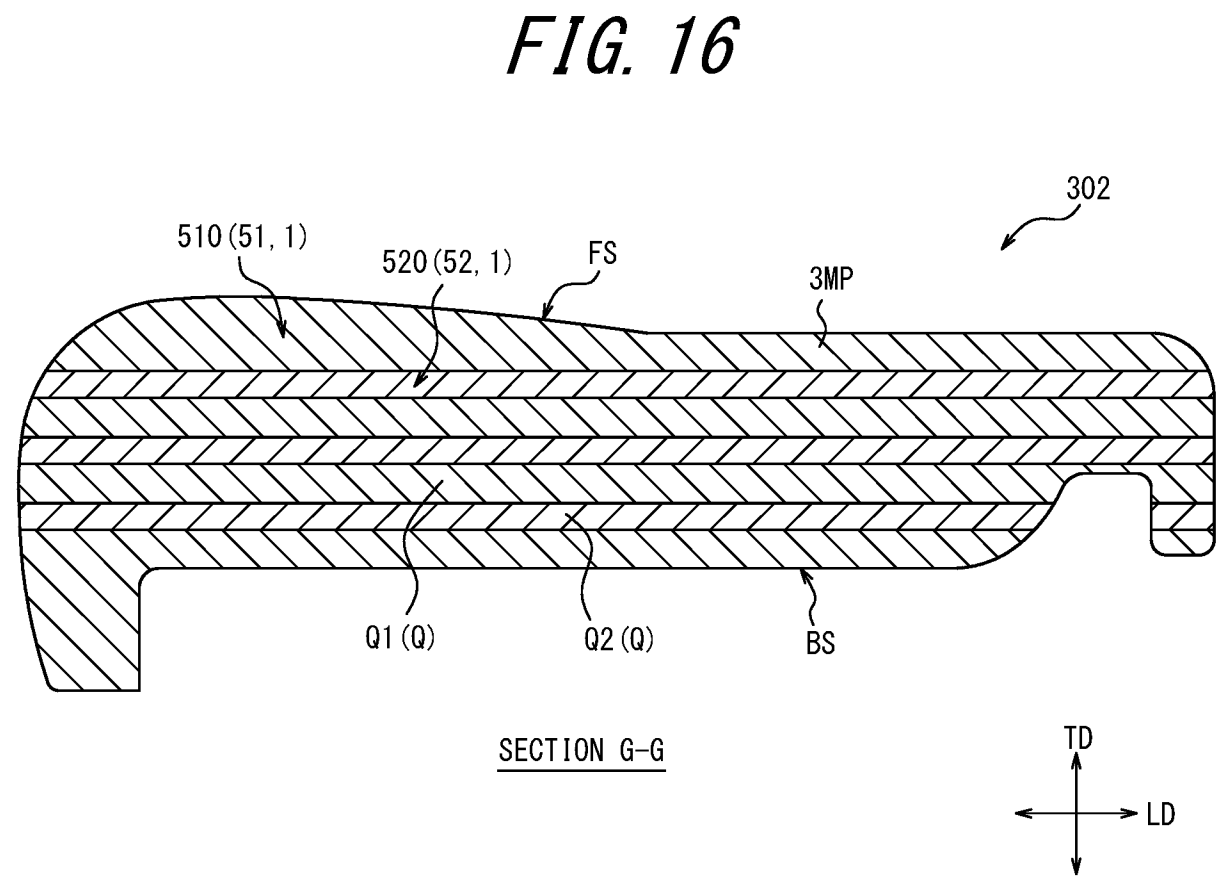

FIG. 16 is a G-G cross-sectional view that schematically illustrates the seat pad of FIG. 15 in cross-section along the line G-G of FIG. 15 and parallel to the pad extension direction;

DETAILED DESCRIPTION

Figure 1:
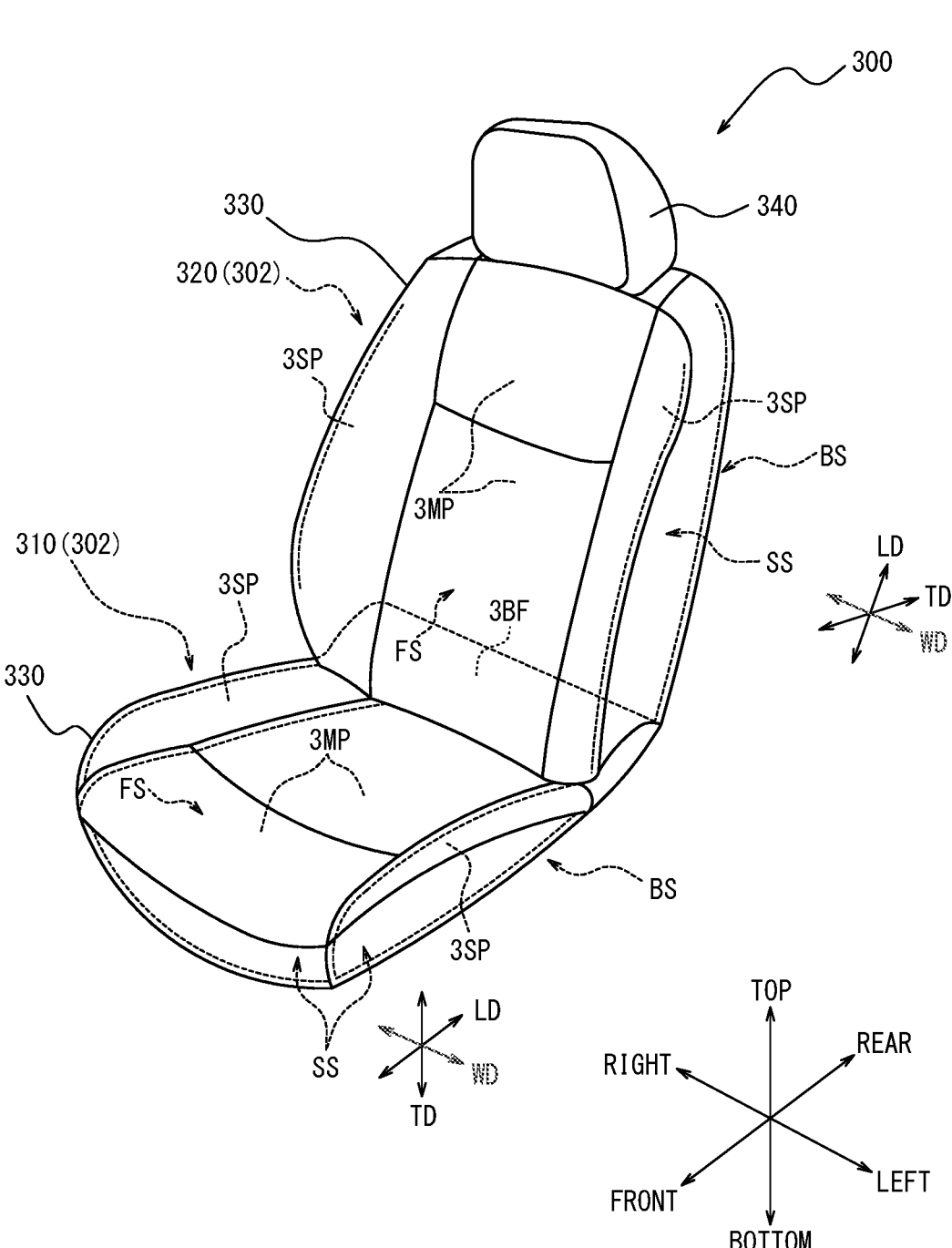
FIG. 1 is a perspective view that schematically illustrates an example of a car seat capable of including a seat pad according to any embodiment of the present disclosure.

A seat pad and a seat pad manufacturing method according to the present disclosure are preferably used as a seat pad for any vehicle, and in particular, are preferably used as a car seat pad.

Embodiments of the seat pad and the seat pad manufacturing method according to the present disclosure will be exemplarily described below with reference to the accompanying drawings.

Any common component in the drawings will be denoted with the same reference sign.

[Seat Pad]

A seat pad 302 according to each of the embodiments described in the present disclosure is preferably used as a seat pad for any vehicle, and in particular, is preferably used as a car seat pad.

FIG. 1 illustrates an example of a car seat 300 capable of including the seat pads 302 according to any embodiment of the present disclosure.

As illustrated in FIG. 1 in the dashed lines, the car seat 300 has a cushion pad 310 for a seated person to sit on and a back pad 320 for supporting the back of the seated person.

The cushion pad 310 and the back pad 320 are each constituted of the seat pads 302. The cushion pad 310 is the seat pad 302 for seating. In this example, the seat pads 302 are configured as car seat pads. In addition to the seat pads 302 constituting the cushion pad 310 and the back pad 320, the car seat 300 can include, for example, outer skins 330 covering at least the front (seated person side) of the seat pads 302, a frame (not illustrated) supporting the cushion pad 310 from the bottom, a frame (not illustrated) installed on the back of the back pad 320, and a headrest 340 installed on the top of the back pad 320 to support the head of the seated person. The outer skins 330 are composed of, for example, a breathable material (such as fabric). The outer skins 330 may cover the entire seat pads 302. In the example of FIG. 1, the cushion pad 310 and the back pad 320 are configured separately from each other, but may be configured as an integral part to each other.

In the example of FIG. 1, the headrest 340 is configured separately from the back pad 320, but the headrest 340 may be configured integrally with the back pad 320.

In this specification, as indicated in FIG. 1, "top", "bottom", "left", "right", "front", and "rear" directions as viewed from the seated person who is seated on the car seat 300 (and thus seat pads 302) are simply referred to as "top", "bottom", "left", "right", "front", and "rear", respectively.

The cushion pad 310 has a main pad portion 3MP configured to support the buttocks and thighs of the seated person from the bottom, and a pair of side pad portions 3SP configured to be located on both the left and right of the main pad portion 3MP and raised above the main pad portion 3MP to support the seated person from both the left and right, and a back pad facing portion 3BF configured to be located on the rear of the main pad portion 3MP and face the back pad 320.

The back pad 320 has a main pad portion 3MP configured to support the back of the seated person from the rear, and a pair of side pad portions 3SP configured to be located on both the left and right of the main pad portion 3MP and raised to the front than the main pad portion 3MP to support the seated person from both the left and right.

In this specification, a "width direction WD of the seat pad 302" (hereinafter also denoted as "pad width direction WD") refers to the left and right directions of the seat pad 302 (FIG. 1).

In this specification, an "extension direction LD of the seat pad 302" (hereinafter also denoted as "pad extension direction LD"), which is a direction perpendicular to the width direction WD and a thickness direction TD of the seat pad 302, refers to the front and rear directions (FIG. 1) in the case of the cushion pad 310, and in the case of the back pad 320, refers to the direction of extension of the main pad portion 3MP over a bottom surface to a top surface of the main pad portion 3MP of the back pad 320 (FIG. 1).

Also, the "thickness direction TD of the seat pad 302" (hereinafter also denoted as "pad thickness direction TD") refers to the top and bottom directions in the case of the cushion pad 310 (FIG. 1), and refers to, in the case of the back pad 320, the direction of extension of the main pad portion 3MP from a seated person-side surface (front surface) FS to a back surface (BS) of the main pad portion 3MP of the back pad 320 (FIG. 1). The seat pad 302 is configured so that a load is input mainly in the pad thickness direction TD.

The "seated person-side surface (front surface) FS" of the seat pad 302 refers to a top surface in the case of the cushion pad 310 (FIG. 1), and refers to a front surface in the case of the back pad 320 (FIG. 1). The "back surface BS" of the seat pad 302, which is a surface opposite the seated person-side surface FS of the seat pad 302, refers to a bottom surface in the case of the cushion pad 310 (FIG. 1), and refers to a rear surface in the case of the back pad 320 (FIG. 1). A "side surface SS" of the seat pad 302, which is a surface between the seated person-side surface FS and the back surface BS of the seat pad 302, refers to one of front, rear, left, and right surfaces in the case of the cushion pad 310 (FIG. 1), and refers to one of bottom, top, left, and right surfaces in the case of the back pad 320 (FIG. 1).

The seat pads 302 according to the various embodiments of the present disclosure will be described below with reference to FIGS. 2 to 17. The seat pad 302 according to each of the embodiments of the present disclosure can be used in a car seat of any configuration, including the car seat 300 described above with reference to FIG. 1. The seat pad 302 according to each of the embodiments of the present disclosure is preferably configured as the cushion pad 310, but may also be configured as the back pad 320.

Figure 2:
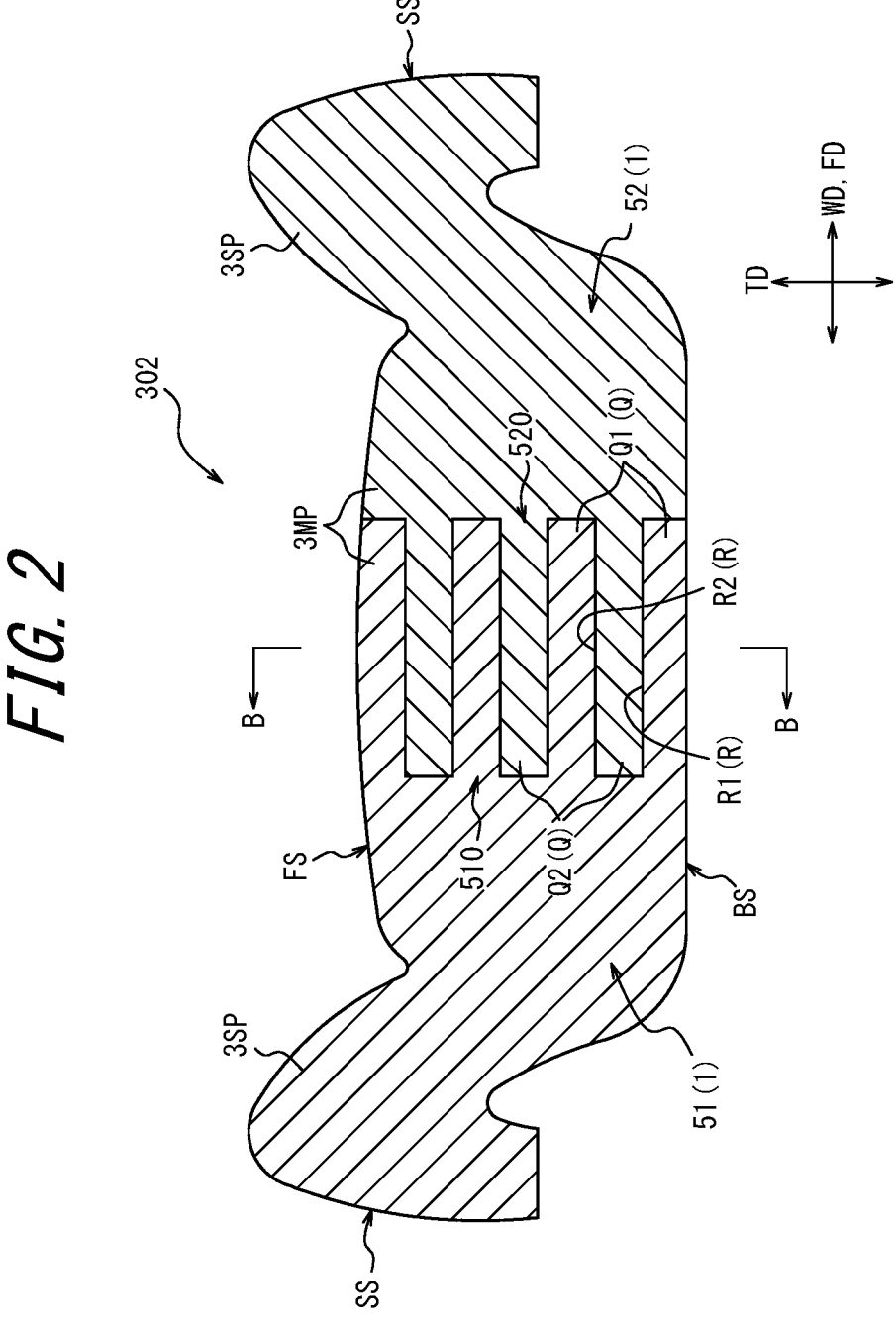
FIG. 2 is a pad width-directional cross-sectional view that schematically illustrates the seat pad according to a first embodiment of the present disclosure in cross-section along a pad width direction.
Figure 3:
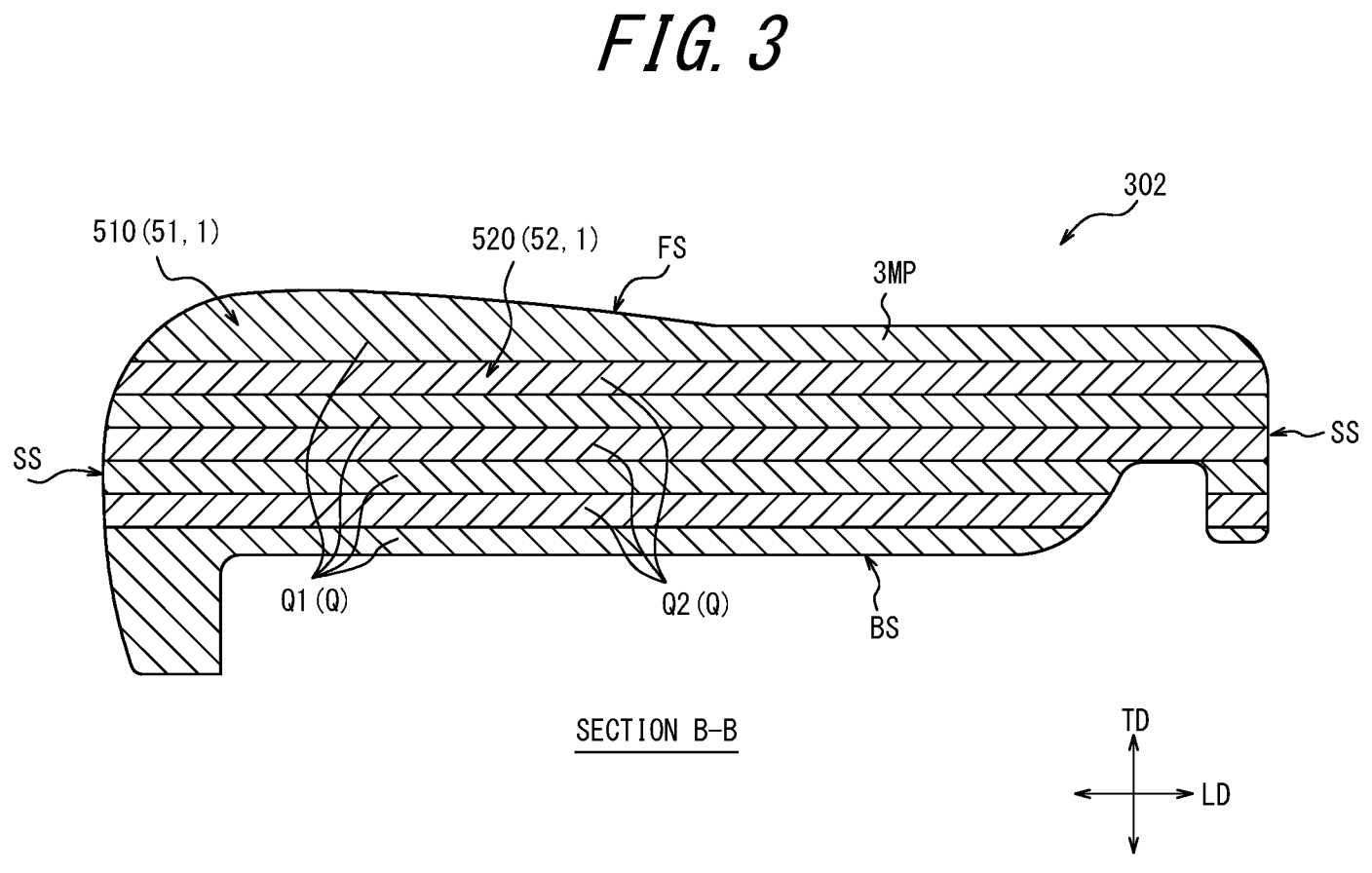

FIGS. 2 to 3 illustrate the seat pad 302 according to a first embodiment of the present disclosure. FIG. 2 schematically illustrates the seat pad 302 according to the first embodiment of the present disclosure in cross-section along the pad width direction WD. FIG. 3 schematically illustrates the seat pad 302 of FIG. 2 in cross-section along the line B-B of FIG. 2 and parallel to the pad extension direction LD. In the example of FIGS. 2 to 3, the seat pad 302 is configured as the cushion pad 310.

The seat pad 302 of this embodiment has a fitting member 51 and a fitted member 52. The fitting member 51 and the fitted member 52 are configured separately from each other. The fitting member 51 has a fitting portion 510. The fitted member 52 has a fitted portion 520 configured to be fitted with the fitting portion 510.

In this specification, "fitting" is not limited to cases in which no gap is formed between two members being fitted together, but also includes cases in which a gap is formed between the two members fitted together. In other words, when the fitting portion 510 and the fitted portion 520 are fitted together, there may be no gap or there may be a gap between the fitting portion 510 and the fitted portion 520.

The fitting portion 510 and the fitted portion 520 may have any concave and convex shape as long as the fitting portion 510 and the fitted portion 520 are configured to be fitted with each other. As in the example illustrated in FIGS. 2 to 3, each of the fitting portion 510 and the fitted portion 520 preferably has one or more convex portions Q and one or more concave portions R. In this case, each convex portion Q (Q1) of the fitting portion 510 is configured to be fitted into the corresponding concave portion R (R2) of the fitted portion 520. Each convex portion Q (Q2) of the fitted portion 520 is configured to be fitted into the corresponding the corresponding concave portion R (R1) of the fitting portion 510.

Each of the convex portions Q and the concave portions R constituting the fitting member 51 and the fitted member 52 extends to a direction FD in which the fitting member 51 and the fitted member 52 face each other (also a direction in which the fitting portion 510 and the fitted portion 520 face each other; hereinafter also referred to as "facing direction FD").

Figure 4:
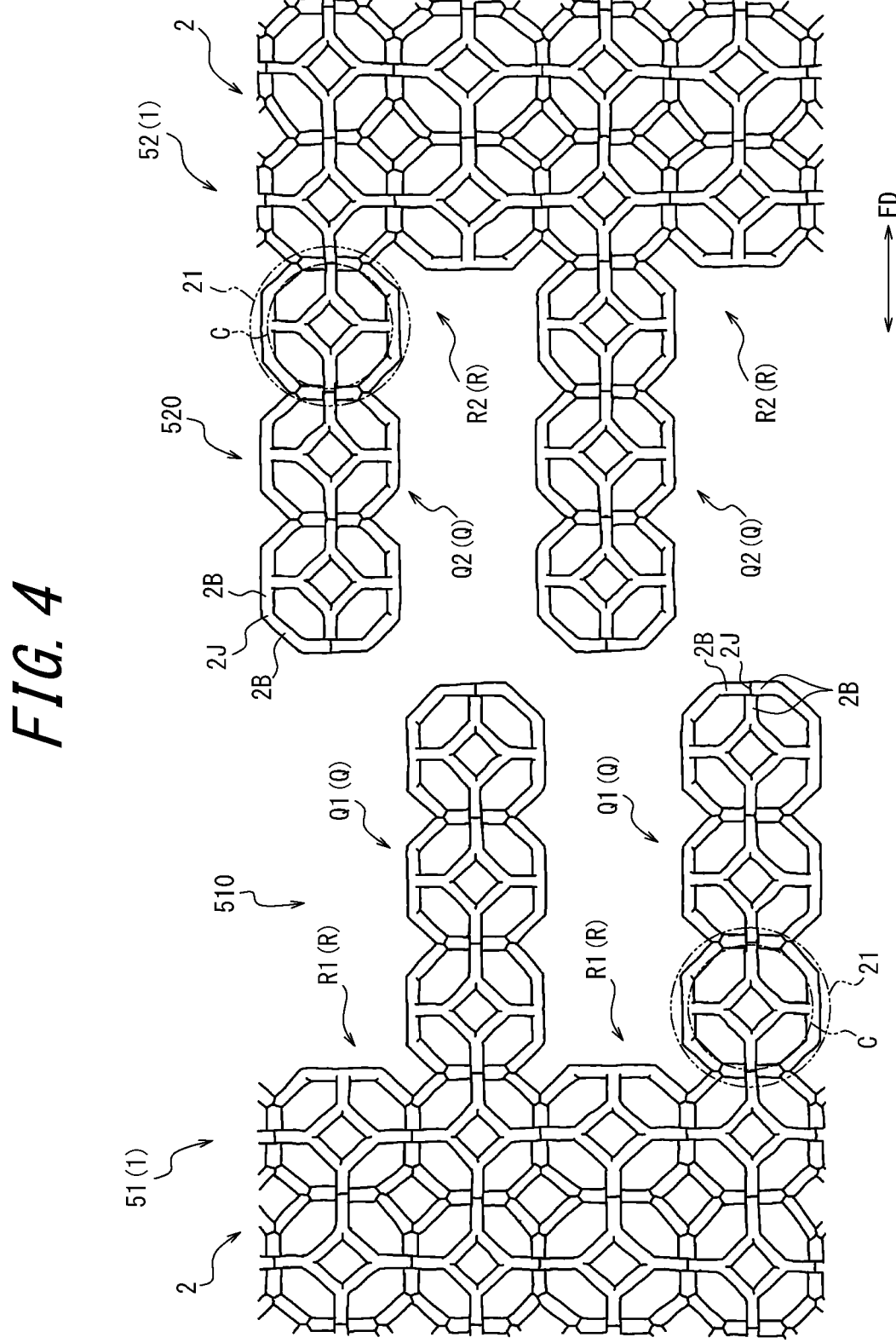
FIG. 4 is a diagram to explain an example of porous structural bodies constituting a fitting member and a fitted member that can be used in the seat pad according to any embodiment of the present disclosure.

Each of the fitting member 51 and the fitted member 52 is constituted of a porous structural body 1, as illustrated in FIG. 4.

Figure 20:
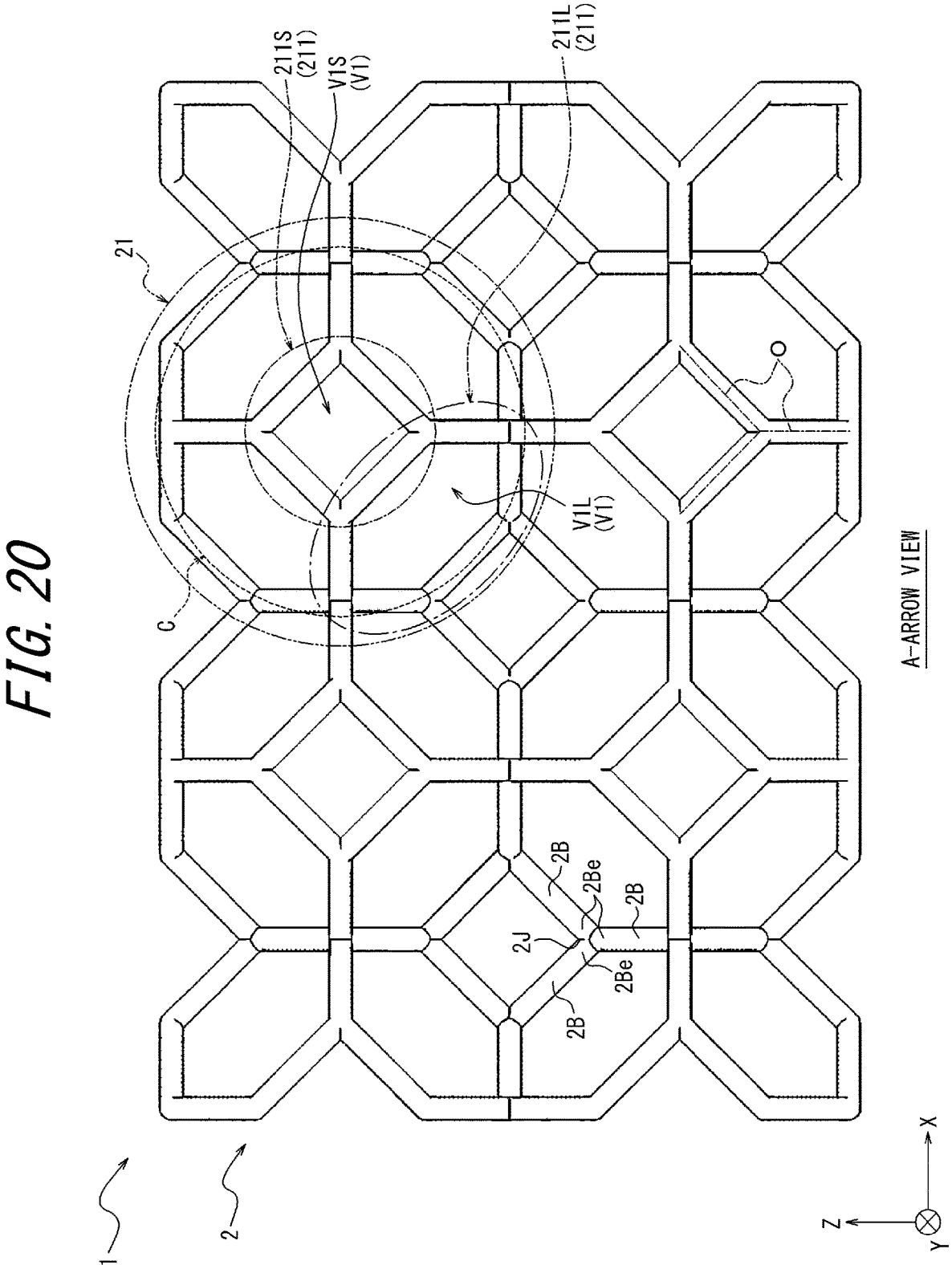
FIG. 20 is an A-arrow view of the porous structural body of FIG. 19, viewed from the direction of the arrow A of FIG. 19.

The porous structural body 1 has a number of cell holes C. As described below, the porous structural body 1 has a skeleton part 2 over almost the entirety of the porous structural body 1, and the skeleton part 2 has a plurality of bone parts 2B and a plurality of connection parts 2J that each connects ends 2Be of the plurality of bone parts 2B (FIG. 4 and FIG. 20). The skeleton part 2 has a plurality (as many as the number of cell holes C) of cell zoning parts 21 that zone the cell holes C inside. The cell zoning part 21 includes a plurality of bone parts 2B and a plurality of connection parts 2J that each connects ends 2Be of the plurality of bone parts 2B.

The porous structural body 1 is composed of a flexible resin or rubber.

Here, the "flexible resin" refers to a resin that can deform by application of an external force, and is preferably an elastomeric resin and is more preferably polyurethane, for example. The rubber includes natural or synthetic rubber. Since the porous structural body 1 is composed of the flexible resin or rubber, the porous structural body 1 is capable of compressing and restoring deformation in response to the application and release of an external force from a user, and thus can have a cushioning property.

The preferable configuration of the porous structural body 1 will be described in detail later with reference to FIGS. 19 to 24.

The fitting member 51 and the fitted member 52 (and thus the porous structural bodies 1) are preferably made by a 3D printer, as will be described later with reference to FIGS. 18A-18C.

By manufacturing the fitting member 51 and the fitted member 52 (and thus the porous structural bodies 1) using the 3D printer, manufacturing is simplified, and the configuration is obtained as expected. In addition, with future technological advances in 3D printers, it is expected that manufacturing using 3D printers will become possible in the future in shorter time and at lower cost. Moreover, by manufacturing the fitting member 51 and the fitted member 52 (and thus the porous structural bodies 1) using the 3D printer, the configuration of the fitting member 51 and the fitted member 52 (and thus the porous structural bodies 1) corresponding to various required properties can be realized easily and as expected.

When the porous structural bodies 1 are manufactured using the 3D printer, a flexible resin or rubber is preferable as a material for the porous structural body 1, and for example, a resin made of light-curing polyurethane (especially UV-curing polyurethane) can be used. As the light-curing polyurethane (especially UV-curing polyurethane), a resin made of urethane acrylate or urethane methacrylate can be used. Such a resin is described in, for example, U.S. Pat. No. 4,337,130.

Figure 5:
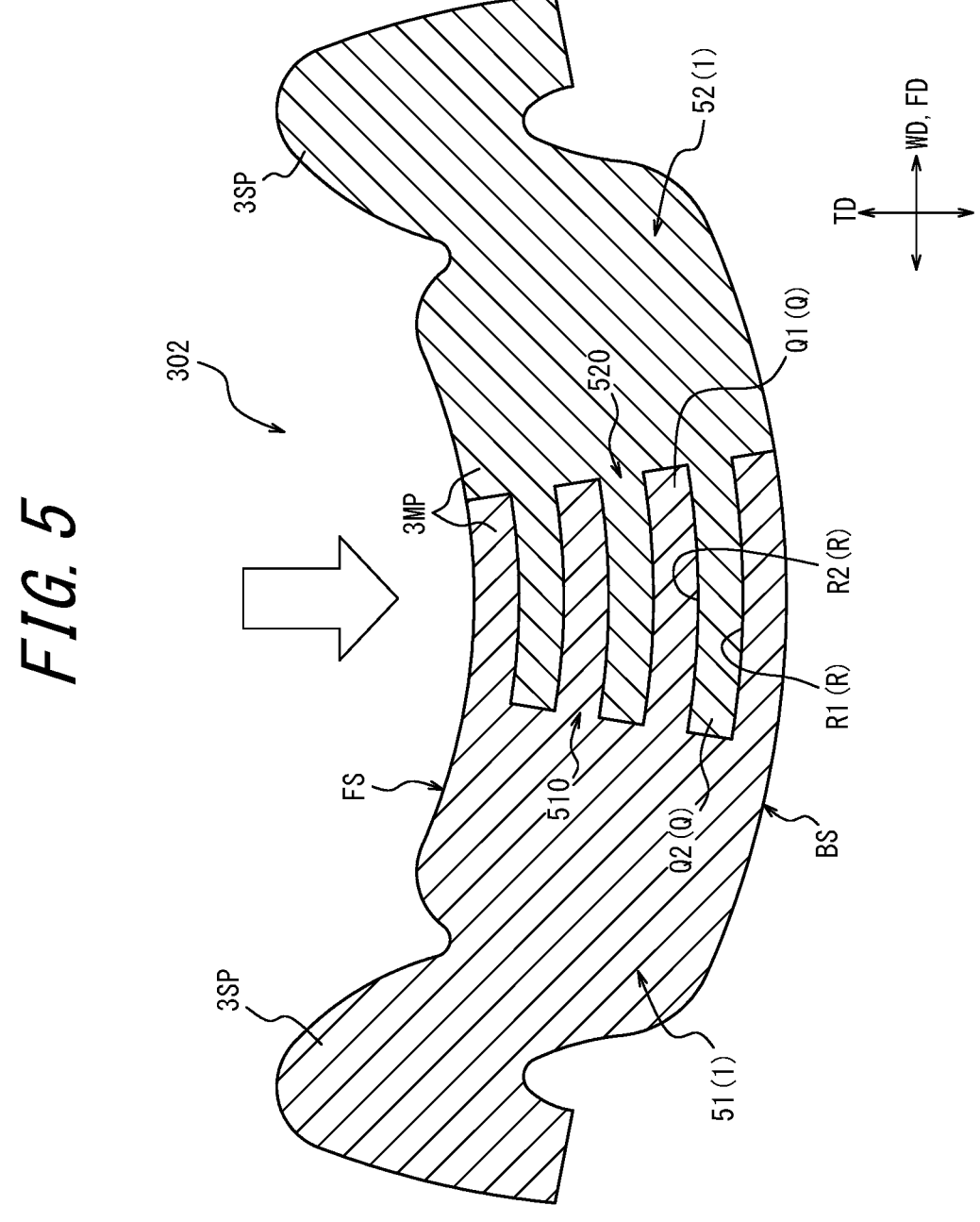
FIG. 5 is a diagram to explain the effects of the seat pad of FIG. 2.
Figure 6:
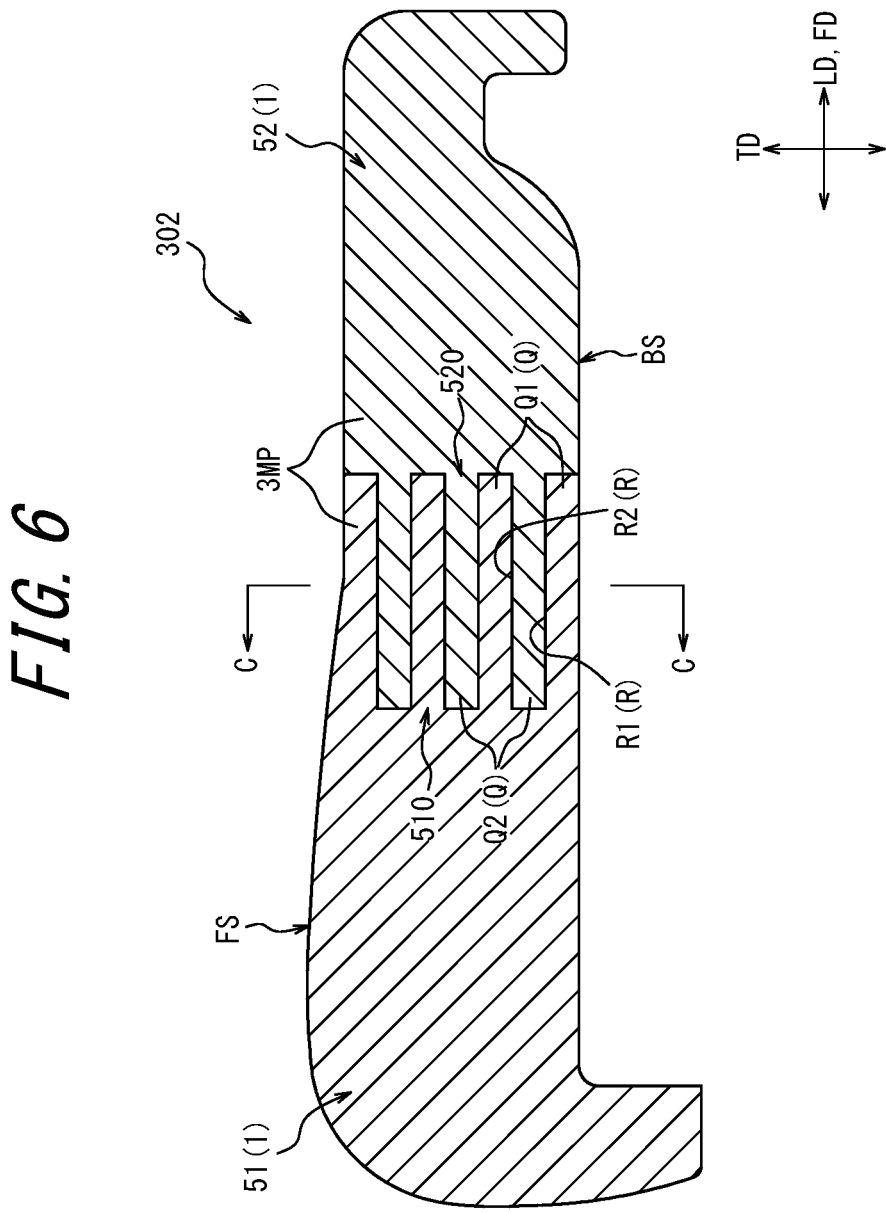
FIG. 6 is a pad extension-directional cross-sectional view that schematically illustrates the seat pad according to a second embodiment of the present disclosure in cross-section along the pad extension direction.
Figure 7:
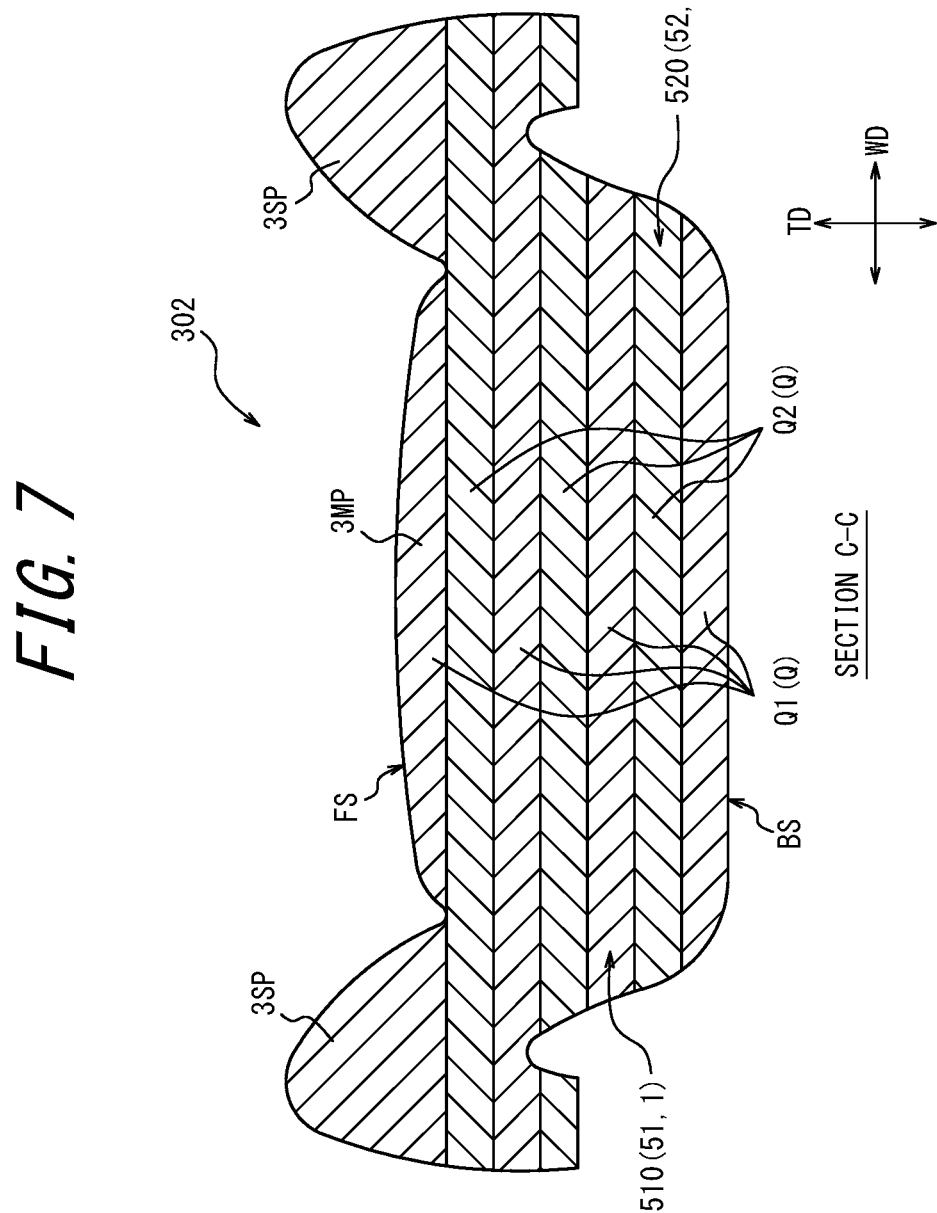
FIG. 7 is a C-C cross-sectional view that schematically illustrates the seat pad of FIG. 6 in cross-section along the line C-C of FIG. 6 and parallel to the pad width direction.

In the seat pad 302 of the first embodiment of the present disclosure described above, due to the provision of the fitting member 51 and the fitted member 52 that are fitted with each other, a fitting area (the fitting portion 510 and the fitted portion 520) of the seat pad 302 between the fitting member 51 and the fitted member 52 flexes more easily than surrounding areas thereof. Therefore, when a load is applied to the seat pad 302 from the user, as illustrated in FIG. 5, the fitting area (the fitting portion 510 and the fitted portion 520) of the seat pad 302 between the fitting member 51 and the fitted member 52 flexes largely relative to the surrounding areas. Therefore, the seat pad 302 of this embodiment can obtain dynamic properties different from those obtained when the seat pad is constituted of a single member made of a porous structural body. When the load is applied to the seat pad 302 from the user, the user is effectively held by an area of the seat pad 302 around the fitting portion 510 and the fitted portion 520, which flex relatively largely, thereby improving a holding property.

In the first embodiment described above, the seat pad 302 is constituted of only two members i.e., the fitting member 51 and the fitted member 52, but in each of the embodiments described in this specification, the seat pad 302 may include three or more members configured to be fitted with each other. In such cases, it is preferable that each pair of any two members configured to be fitted with each other, among these three or more members, meet any configuration of the fitting member 51 and the fitted member 52 described in this specification.

In the first embodiment described above, the fitting member 51 and the fitted member 52 constitute the entire seat pad 302. However, in each of the embodiments described in this specification, the fitting member 51 and the fitted member 52 may constitute only part of the seat pad 302. In such cases, the other part of the seat pad 302 may be constituted of any member.

In each of the embodiments described in this specification, as in each of the embodiments of FIGS. 2 to 3 and FIGS. 6 to 16, at least part of the fitting portion 510 and the fitted portion 520 is preferably disposed in the main pad portion 3MP of the seat pad 302.

Generally, the seat pad 302 is configured so that a load from the user is mainly applied to the main pad portion 3MP. Since the fitting portion 510 and the fitted portion 520 are disposed in the main pad portion 3MP, when the load is applied to the main pad portion 3MP, a fitting area (the fitting portion 510 and the fitted portion 520) of the main pad portion 3MP between the fitting member 51 and the fitted member 52 flexes largely relative to the surrounding areas, which improves the holding property.

From the same perspective, in each of the embodiments described in this specification, the fitting portion 510 and the fitted portion 520 are more preferably disposed on the center of the main pad portion 3MP in the pad width direction WD.

In each of the embodiments described in this specification, as in each of the embodiments of FIGS. 2 to 3 and FIGS. 6 to 16, the fitting member 51 and the fitted member 52 preferably face each other in a direction perpendicular to the thickness direction (pad thickness direction) TD of the seat pad 302.

Generally, the seat pad 302 is configured so that a load from the user is mainly applied to the pad thickness direction TD. Since the fitting member 51 and the fitted member 52 face each other in the direction perpendicular to the pad thickness direction TD, when the load is applied to the pad thickness direction TD, the fitting area (the fitting portion 510 and the fitted portion 520) between the fitting member 51 and the fitted member 52 can effectively flex. This improves the holding property.

For example, as in each of the embodiments of FIGS. 2 to 3 and FIGS. 8 to 16, the fitting member 51 and the fitted member 52 may face each other in the pad width direction WD. Alternatively, as in the embodiment of FIGS. 6 to 7, the fitting member 51 and the fitted member 52 may face each other in the pad extension direction LD.

When the fitting member 51 and the fitted member 52 face each other in the direction perpendicular to the pad thickness direction TD, the convex portions Q (Q1) and the concave portions R (R1) constituting the fitting portion 510 are alternately arranged along the pad thickness direction TD, and the convex portions Q (Q2) and the concave portions R (R2) constituting the fitted portion 520 are alternately arranged along the pad thickness direction TD.

In each of the embodiments described in this specification, as in each of the embodiments of FIGS. 2 to 3, FIGS. 6 to 7, and FIGS. 9 to 16, the fitting member 51 and the fitted member 52 (and thus the fitting portion 510 and the fitted portion 520) may not be bonded to each other. In such cases, by covering the seat pad 302 with the outer skin 330 (FIG. 1), the fit between the fitting member 51 and the fitted member 52 is prevented from being released.

Figure 8:
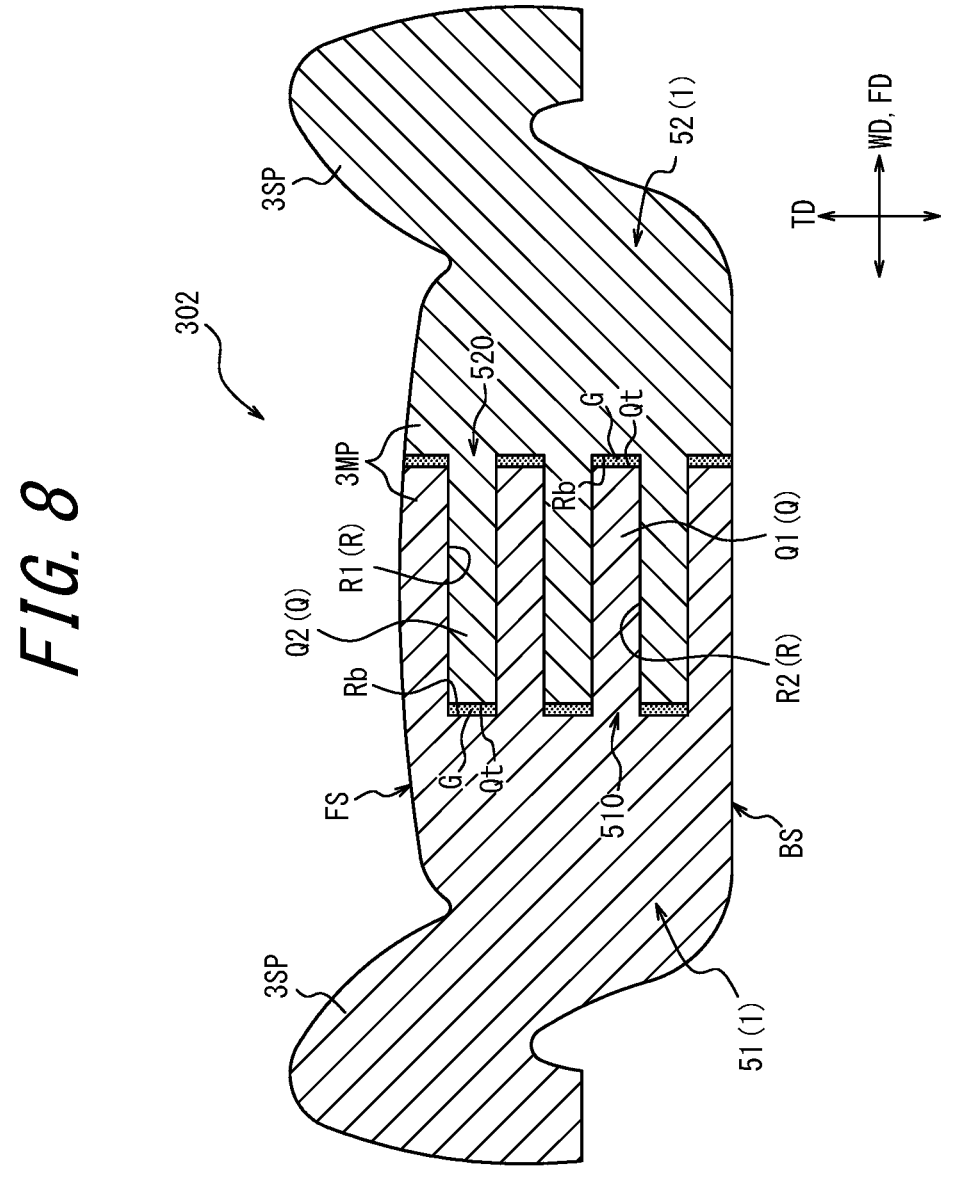
FIG. 8 is a diagram to explain the seat pad according to a third embodiment of the present disclosure.
Figure 9:
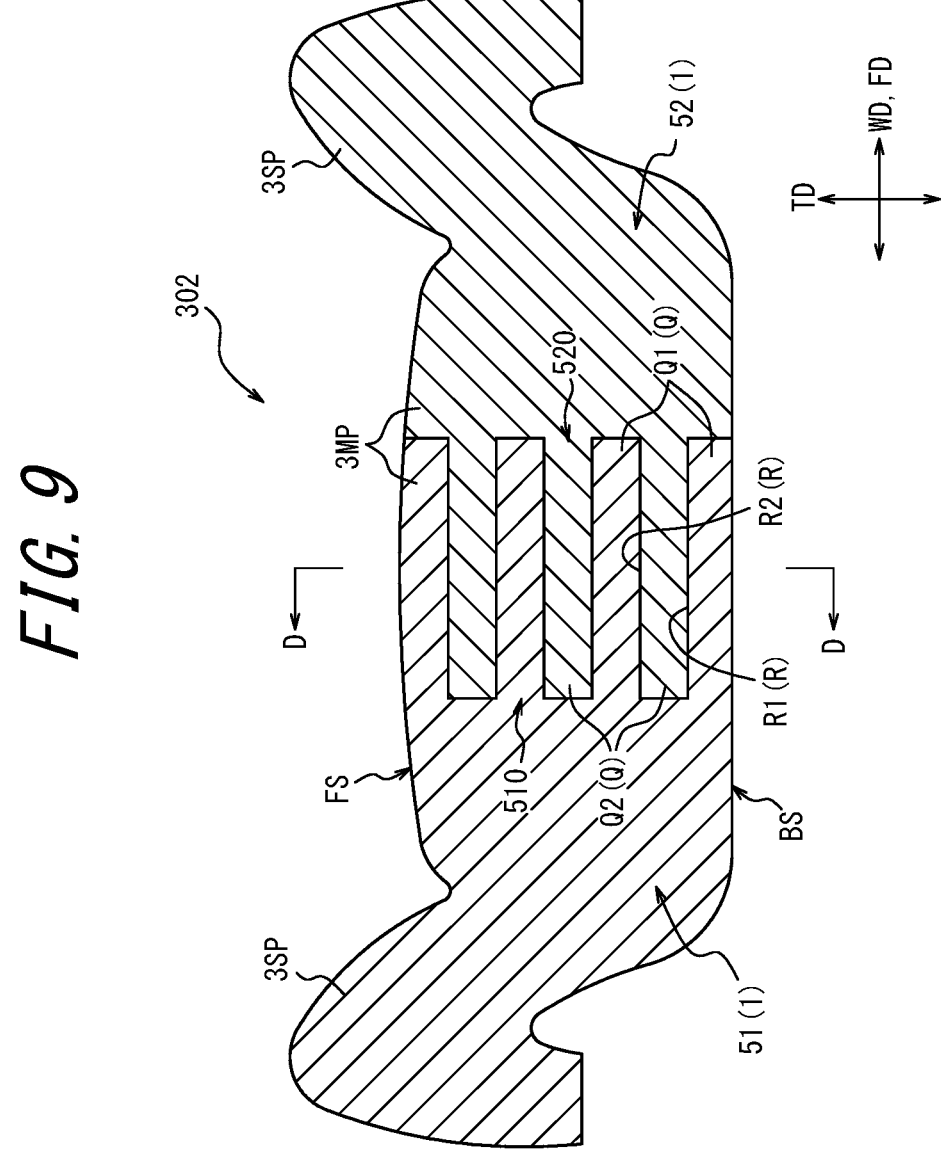
FIG. 9 is a pad width-directional cross-sectional view that schematically illustrates the seat pad according to a fourth embodiment of the present disclosure in cross-section along the pad width direction.

Alternatively, in each of the embodiments described in this specification, as in the embodiment of FIG. 8, the fitting member 51 and the fitted member 52 (and thus the fitting portion 510 and the fitted portion 520) may be at least partially bonded to each other. In such cases, as illustrated in FIG. 8, glue G is preferably disposed at least between a tip surface Qt of each convex portion Q of the fitting portion 510 and the fitted portion 520 and a bottom surface Rb (a surface opposite an opening surface of each concave portion R) of each concave portion R of the fitting portion 510 and the fitted portion 520, and is more preferably disposed only between the tip surface Qt of each convex portion Q of the fitting portion 510 and the fitted portion 520 and the bottom surface Rb of each concave portion R of the fitting portion 510 and the fitted portion 520.

In each of the embodiments described in this specification, as with the fitting portion 510 and the fitted portion 520 in each of the embodiments of FIGS. 2 to 3, FIGS. 6 to 7, and FIGS. 13 to 16, in cross-section (FIGS. 3, 7, 14 and 16) perpendicular to the facing direction FD of the fitting portion 510 and the fitted portion 520, the fitting portion 510 and the fitted portion 520 (and thus the convex portions Q constituting these portions) may extend over the entire length of the seat pad 302. In such cases, since the fitting portion 510 and the fitted portion 520 are present over a wider area, it becomes easier to obtain dynamic properties different from those obtained when the seat pad is constituted of a single member made of a porous structural body. For example, when the fitting member 51 and the fitted member 52 face each other in the direction perpendicular to the pad thickness direction TD, as in each of the embodiments of FIGS. 2 to 3, FIGS. 6 to 7, and FIGS. 13 to 16, the fitting portion 510 and the fitted portion 520 (and thus the convex portions Q constituting the portions) may extend over the entire length of the seat pad 302 in a direction perpendicular to both the pad thickness direction TD and the facing direction FD.

Alternatively, in each of the embodiments described in this specification, as with the fitted portion 520 in each of the embodiments of FIGS. 9 to 12, in cross-section (FIGS. 10 and 12) perpendicular to the facing direction FD of the fitting portion 510 and the fitted portion 520, at least one of the fitting portion 510 and the fitted portion 520 (and thus the convex portions Q constituting these portions) may extend to only part of the seat pad 302. For example, when the fitting member 51 and the fitted member 52 face each other in the direction perpendicular to the pad thickness direction TD, as with the fitted portion 520 in each of the embodiments of FIGS. 9 to 12, at least one of the fitting portion 510 and the fitted portion 520 (and thus the convex portions Q constituting these portions) may extend to only part of the seat pad 302 in the direction perpendicular to both the pad thickness direction TD and the facing direction FD.

In each of the embodiments described in this specification, the convex portions Q and the concave portions R constituting the fitting portion 510 and the fitted portion 520 may have any shape. By adjusting the shape of the convex portions Q and concave portions R constituting the fitting portion 510 and the fitted portion 520, the dynamic properties of the seat pad 302 can be adjusted.

Figure 15:
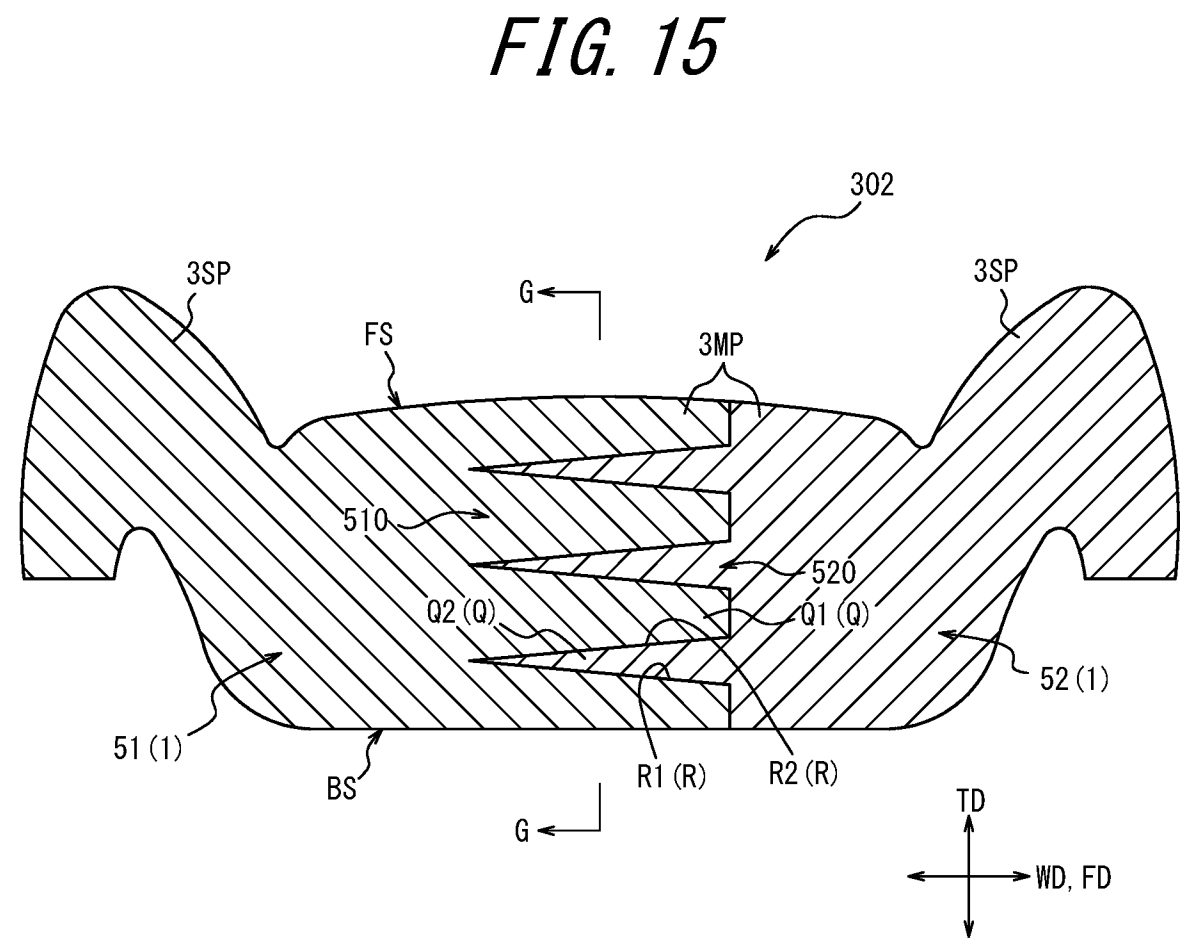

For example, the convex portions Q and the concave portions R constituting the fitting portion 510 and the fitted portion 520 may be, in cross-section in the facing direction FD (and thus in an extension direction of the convex portions Q and the concave portions R), in the shape of a tetragon as in each of the embodiments of FIGS. 2, 6, 8, 9, 11, and 13, in the shape of a triangle as with the convex portions Q2 and the concave portions R1 in the embodiment of FIG. 15, in the shape of a trapezoid as with the convex portions Q1 and the concave portions R2 in the embodiment of FIG. 15, or in any other shape.

Figure 10:
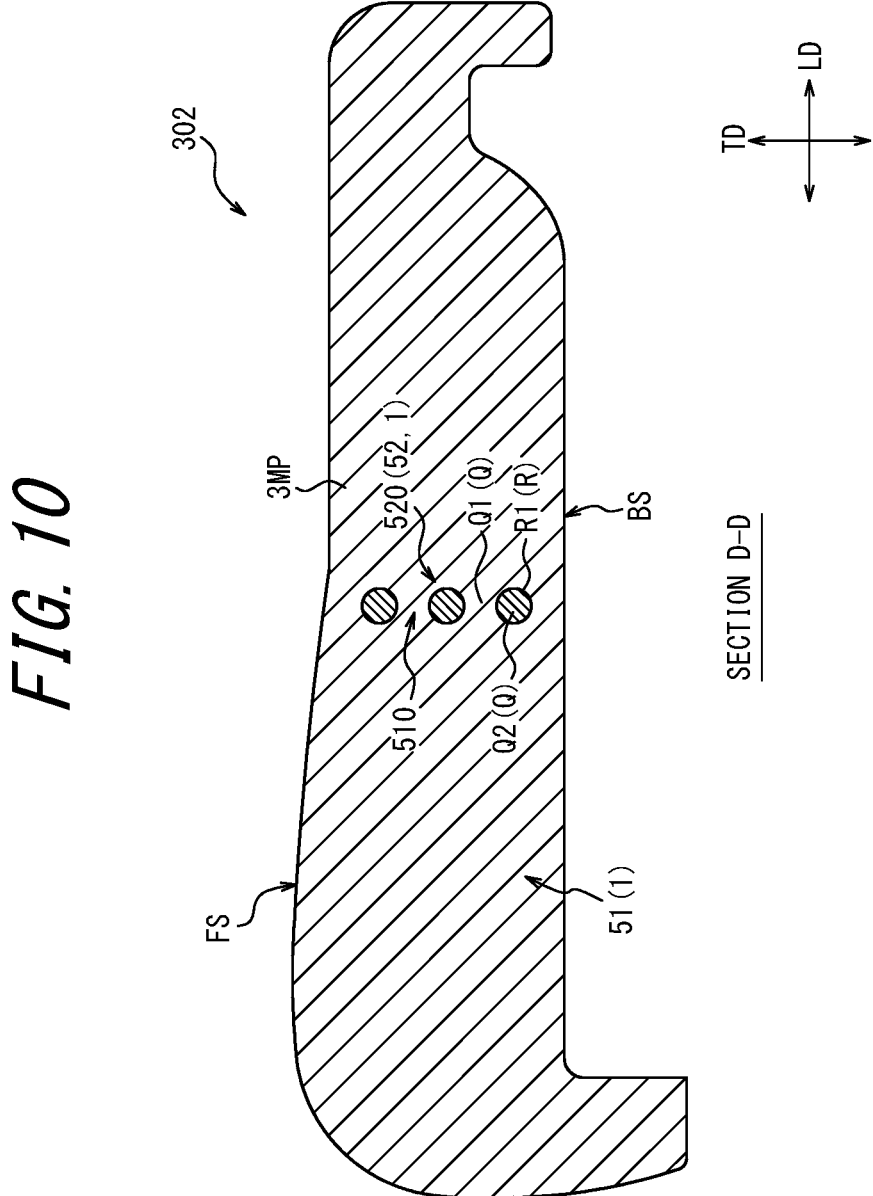
FIG. 10 is a D-D cross-sectional view that schematically illustrates the seat pad of FIG. 9 in cross-section along the line D-D of FIG. 9 and parallel to the pad extension direction.
Figure 11:
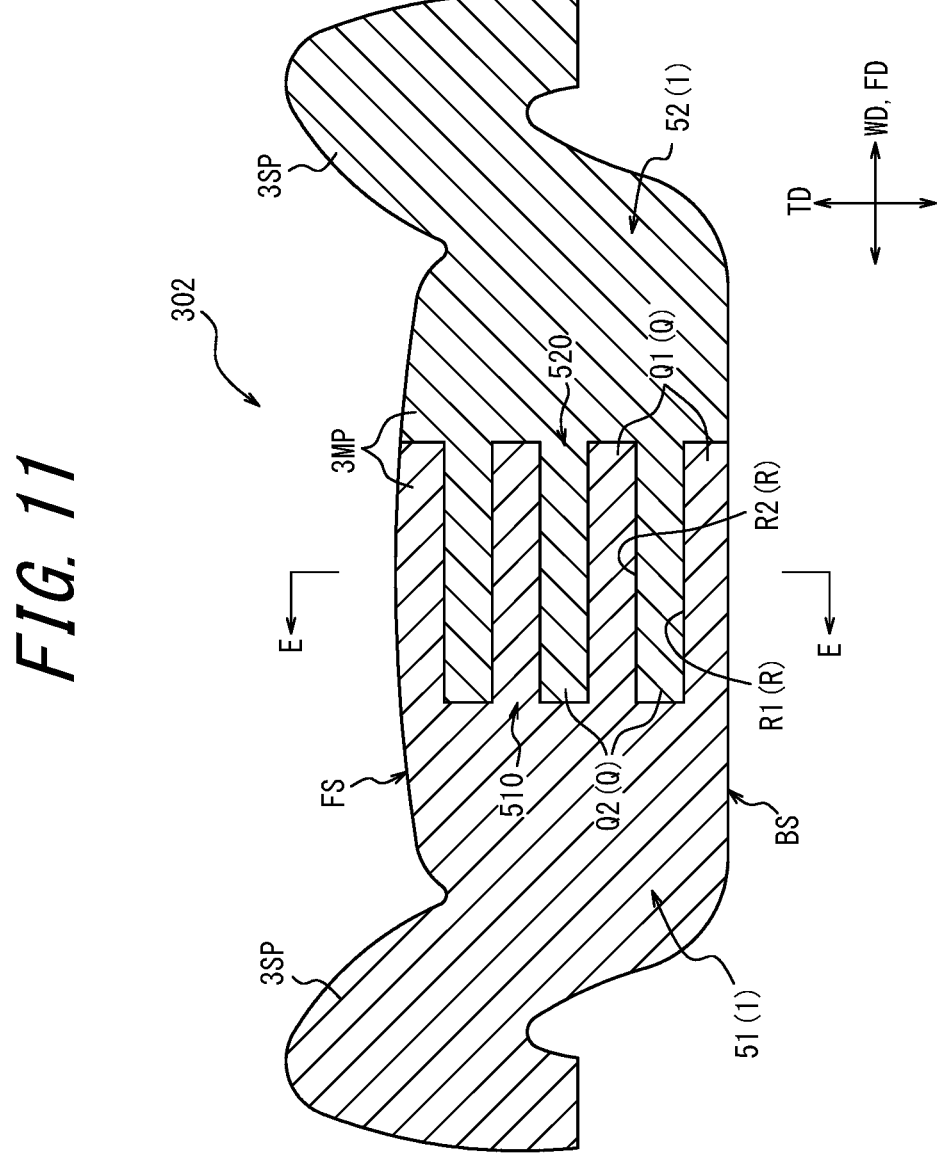
FIG. 11 is a pad width-directional cross-sectional view that schematically illustrates the seat pad according to a fifth embodiment of the present disclosure in cross-section along the pad width direction.
Figure 12:
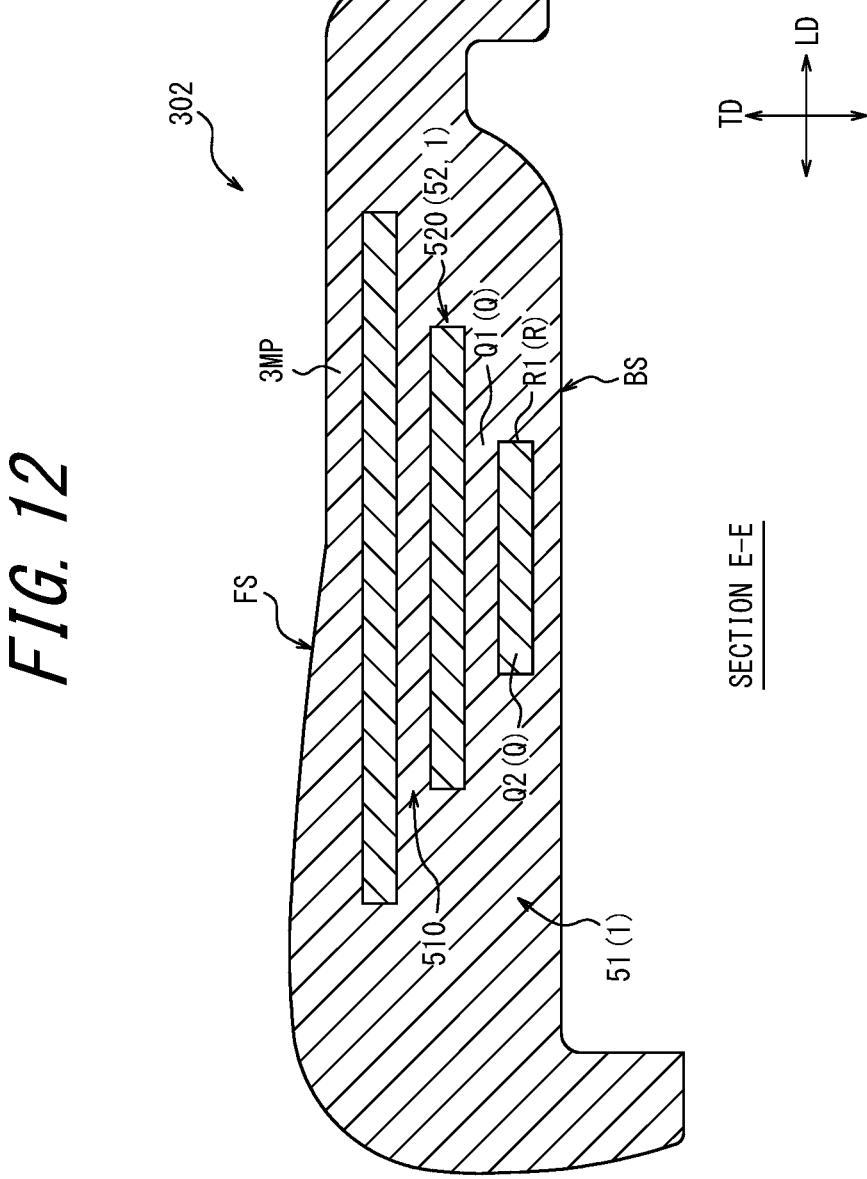
FIG. 12 is an E-E cross-sectional view that schematically illustrates the seat pad of FIG. 11 in cross-section along the line E-E of FIG. 11 and parallel to the pad extension direction.

Each of the convex portions Q and the concave portions R constituting the fitting portion 510 and the fitted portion 520 may be, in cross-section in the direction perpendicular to the facing direction FD and (and thus in a direction perpendicular to the extension direction of the convex portions Q and the concave portions R), in the shape of a plate with a uniform thickness along a width direction of the convex portions Q and the concave portions R as in each of the embodiments of FIGS. 3, 7, 14 and 16, in the shape of a circle as with the convex portions Q2 and the concave portions R1 in the embodiment of FIG. 10, in the shape of a tetragon as with the convex portions Q2 and the concave portions R1 in the embodiment of FIG. 12, or in any other shape (such as a triangle, a trapezoid, another polygon, or the like).

The width direction of the convex portions Q is, in cross-section in the direction perpendicular to the facing direction FD (and thus the direction perpendicular to the extension direction of the convex portions Q), a direction (in the embodiment of FIG. 3, the pad extension direction LD) perpendicular to the direction (in the embodiment of FIG. 3, the pad thickness direction TD) in which the convex portions Q are arranged. The width direction of the concave portions R is, in cross-section in the direction perpendicular to the facing direction FD (and thus the direction perpendicular to the extension direction of the concave portions R), a direction (in the embodiment of FIG. 3, the pad extension direction LD) perpendicular to the direction (in the embodiment of FIG. 3, the pad thickness direction TD) in which the concave portions R are arranged.

By adjusting the dimensions of the convex portions Q and the concave portions R constituting the fitting portion 510 and the fitted portion 520, the dynamic properties of the seat pad 302 can be adjusted.

In each of the embodiments described in this specification, as with the fitted portion 520 in the embodiment of FIG. 10, at least one of the fitting portion 510 and the fitted portion 520 may have a plurality of convex portions Q, and the width of the plurality of convex portions Q may be uniform (i.e., the same as each other). In such cases, as with the fitted portion 520 in the embodiment of FIG. 10, in cross-section (FIG. 10) perpendicular to the facing direction FD of the fitting portion 510 and the fitted portion 520, at least one of the fitting portion 510 and the fitted portion 520 (and thus the convex portions Q comprising the portion) preferably extends to only part of the seat pad 302.

Alternatively, in each of the embodiments described in this specification, as with the fitted portion 520 in the embodiment of FIG. 12, at least one of the fitting portion 510 and the fitted portion 520 may have a plurality of convex portions Q, and the width of the plurality of convex portions Q may be non-uniform (i.e., different from one another). In such cases, as in the fitted portion 520 in the embodiment of FIG. 12, the plurality of convex portions Q preferably has a smaller width as the convex portion Q closer to the back surface BS of the seat pad 302. This can improve seating comfort. In such cases, as with the fitted portion 520 in the embodiment of FIG. 12, in cross-section (FIG. 12) perpendicular to the facing direction FD of the fitting portion 510 and the fitted portion 520, at least one of the fitting portion 510 and the fitted portion 520 (and thus the convex portions Q constituting the portion) preferably extends to only part of the seat pad 302.

Here, the width of the convex portion Q refers to a dimension in the width direction of the convex portion Q, and the width direction of the convex portion Q is, in cross-section in the direction perpendicular to the facing direction FD (and thus in the direction perpendicular to the extension direction of the convex portion Q), a direction (in each of the embodiments of FIGS. 10 and 12, the pad extension direction LD) perpendicular to the direction (in each of the embodiments of FIGS. 10 and 12, the pad thickness direction TD) in which the convex portions Q are arranged.

In each of the embodiments described in this specification, as with the fitting portion 510 and the fitted portion 520 in each of the embodiments of FIGS. 2, 6, 8, 9, 11, and 15, at least one of the fitting portion 510 and the fitted portion 520 has a plurality of convex portions Q, and the extension length of the plurality of convex portions Q is uniform (i.e., the same as each other).

Figure 13:
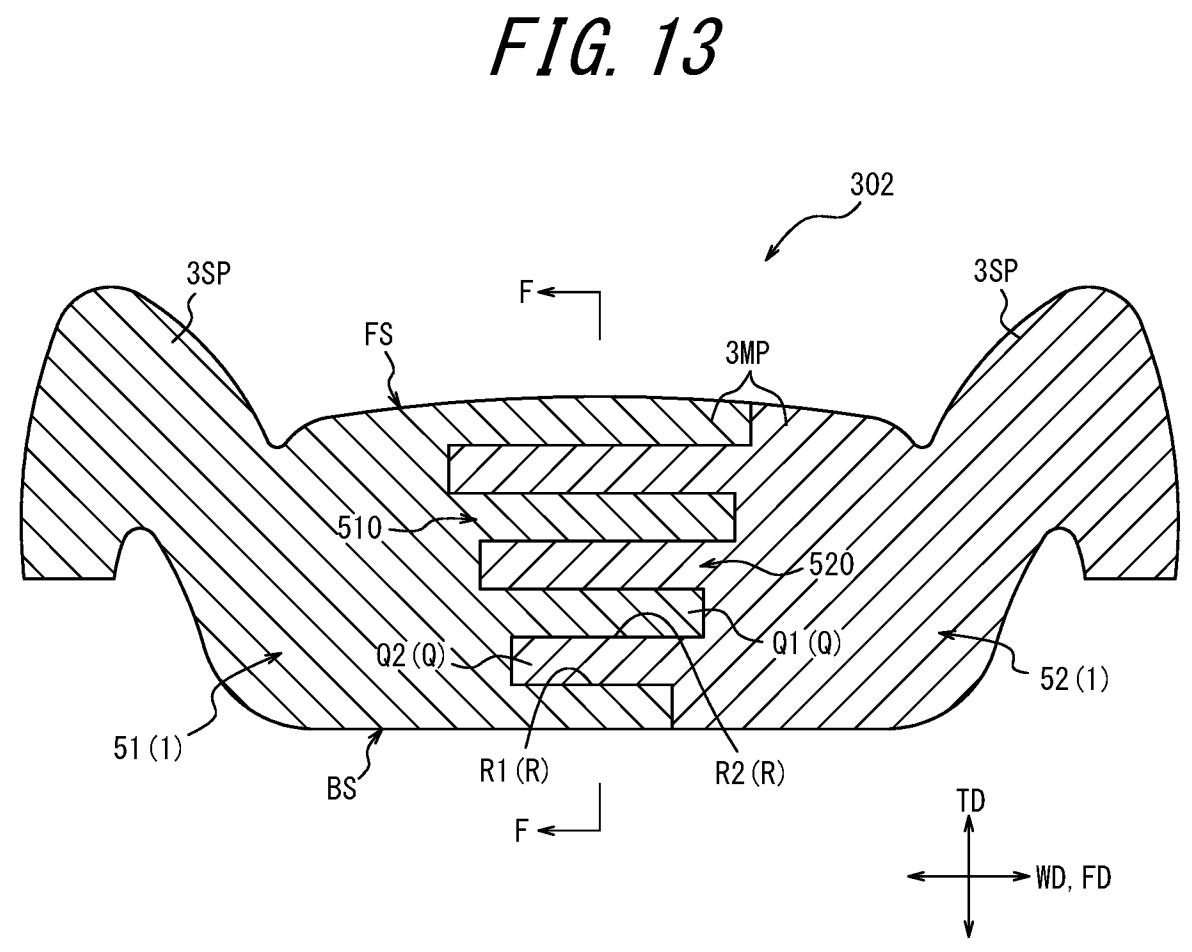

Alternatively, in each of the embodiments described in this specification, as with the fitting portion 510 and the fitted portion 520 in the embodiment of FIG. 13, at least one of the fitting portion 510 and the fitted portion 520 may have a plurality of convex portions Q, and the extension length of the plurality of convex portions Q may be non-uniform (i.e., different from each other). In such cases, as in the fitting portion 510 and the fitted portion 520 in the embodiment of FIG. 13, the plurality of convex portions Q preferably has a smaller extended length as the convex portion Q closer to the back surface BS of the seat pad 302. This can improve seating comfort.

Here, the extension length of the convex portion Q refers to a dimension in the extension direction of the convex portion Q, and the extension direction of the convex portion Q is the same as the facing direction FD.

In each of the embodiments described in this specification, from the viewpoint of obtaining dynamic properties different from those obtained when the seat pad is constituted of a single member made of a porous structural body, in the fitting portion 510 and the fitted portion 520, the extension length of each convex portion Q is preferably 1 cm or more, more preferably 5 cm or more, and even more preferably 10 cm or more. In each of the embodiments described in this specification, in the fitting portion 510 and the fitted portion 520, the extended length of each convex portion Q is preferably 60 cm or less, more preferably 40 cm or less, and even more preferably 30 cm or less.

In each of the embodiments described in this specification, from the viewpoint of obtaining dynamic properties different from those obtained when the seat pad is constituted of a single member made of a porous structural body, the number of cell zoning parts 21 (FIG. 4) that are arranged along the extension direction of the convex portion Q to constitute each convex portion Q of each of the fitting portion 510 and the fitted portion 520 is preferably 1 or more, more preferably 5 or more, and even more preferably 10 or more. In each of the embodiments described in this specification, the number of cell zoning parts 21 that are arranged along the extension direction of the convex portion Q to constitute each convex portion Q of each of the fitting portion 510 and the fitted portion 520 is preferably 60 or less, more preferably 40 or less, and even more preferably 30 or less.

In each embodiment described in this specification, at least one of the fitting portion 510 and the fitted portion 520 has a plurality of convex portions Q, and the thickness of the plurality of convex portions Q may be uniform (i.e., the same as each other) or non-uniform (i.e., different from each other).

The thickness of the convex portion Q refers to a dimension in a thickness direction of the convex portion Q, and the thickness direction of the convex portion Q is, in cross-section in the direction perpendicular to the facing direction FD (and thus the direction perpendicular to the extension direction of the convex portion Q), the same as the direction in which the convex portions Q are arranged (in each of the embodiments of FIGS. 10 and 12, the pad thickness direction TD).

In each of the embodiments described in this specification, each convex portion Q of the fitting portion 510 and the fitted portion 520 may have, as in the embodiment of FIG. 4, only one cell zoning part 21 (FIG. 4) constituting the convex portion Q along the thickness direction of the convex portion Q, or may have a plurality of cell zoning parts 21 arranged along the thickness direction of the convex portion Q.

In each of the embodiments described in this specification, from the viewpoint of obtaining dynamic properties different from those obtained when the seat pad is constituted of a single member made of a porous structural body, the number of convex portions Q the fitting portion 510 and the fitted portion 520 each have is preferably 1 or more, and more preferably 2 or more. The number of convex portions Q the fitting portion 510 and the fitted portion 520 each have is preferably 8 or less, and more preferably 6 or less.

In each of the embodiments described in this specification, from the viewpoint of obtaining dynamic properties different from those obtained when the seat pad is constituted of a single member made of a porous structural body, the number of recesses R the fitting portion 510 and the fitted portion 520 each have is preferably 1 or more, and more preferably 2 or more. The number of recesses R the fitting portion 510 and the fitted portion 520 each have is preferably 8 or less, and more preferably 6 or less.

In each of the embodiments described in this specification, as in the fitting member 51 in the example illustrated in FIG. 4, the thickness (cross-sectional area) of each bone part 2B constituting the fitting member 51 may be uniform (i.e., the same as each other). In each of the embodiments described in this specification, as in the fitted member 52 in the example illustrated in FIG. 4, the thickness (cross-sectional area) of each bone part 2B constituting the fitted member 52 may be uniform (i.e., the same as each other). The thickness (cross-sectional area) of each bone part 2B constituting the fitting member 51 and the thickness (cross-sectional area) of each bone part 2B constituting the fitted member 52 may be the same as each other as in the example illustrated in FIG. 4, or different from each other.

Figure 17:
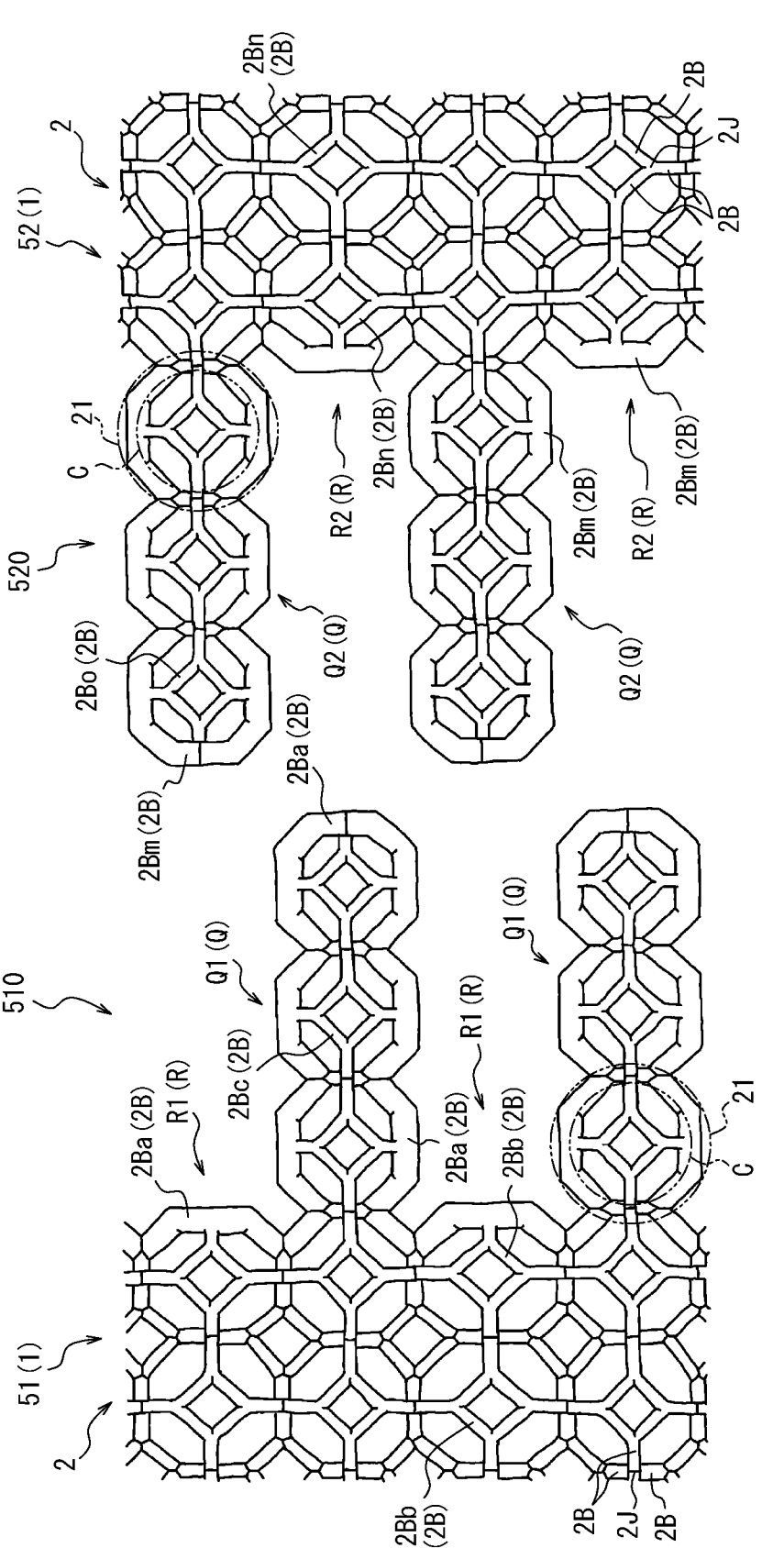
FIG. 17 is a diagram to explain another example of the porous structural bodies constituting the fitting member and the fitted member that can be used in the seat pad according to any embodiment of the present disclosure.

Alternatively, in each of the embodiments described in this specification, as with the fitting member 51 in the example illustrated in FIG. 17, the thickness (cross-sectional area) of each bone part 2B constituting the fitting member 51 may be non-uniform (i.e., different from each other). In each of the embodiments described in this specification, as with the fitted member 52 in the example illustrated in FIG. 17, the thickness (cross-sectional area) of each bone part 2B constituting the fitted member 52 may be non-uniform (i.e., different from each other).

For example, as in the fitting member 51 in the example illustrated in FIG. 17, among the bone parts 2B constituting the fitting portion 510 of the fitting member 51, each of bone parts 2B (2Ba) that are configured to contact the fitted portion 520 of the fitted member 52 may be thicker (i.e., have a larger cross-sectional area) than each of bone parts 2B (2Bb) constituting a portion of the fitting member 51 other than the fitting portion 510. Also, as in the fitted member 52 in the example illustrated in FIG. 17, among the bone parts 2B constituting the fitted portion 520 of the fitted member 52, each of bone parts 2B (2Bm) that are configured to contact the fitting portion 510 of the fitting member 51 may be thicker (i.e., have a larger cross-sectional area) than each of bone parts 2B (2Bn) constituting a portion of the fitted member 52 other than the fitted portion 520. In this case, compared to the case in which the thickness (cross-sectional area) of each bone part 2B of the fitting member 51 and the fitted member 52 is uniform as in the example illustrated in FIG. 4, a frictional force (and thus viscosity) acting between the fitting portion 510 and the fitted portion 520 during load input can be changed, so it becomes further easier to obtain dynamic properties different from those obtained when the seat pad is constituted of a single member made of a porous structural body.

When, among the bone parts 2B constituting the fitting portion 510 of the fitting member 51, each of the bone parts 2B (2Ba) that are configured to contact the fitted portion 520 of the fitted member 52 is thicker (i.e., has a larger cross-sectional area) than each of the bone parts 2B (2Bb) constituting a portion of the fitting member 51 other than the fitting portion 510, as in the fitting member 51 in the example illustrated in FIG. 17, among the bone parts 2B constituting the fitting portion 510, each of the bone parts 2B (2Ba) that are configured to contact the fitted portion 520 may be thicker (i.e., have a larger cross-sectional area) than, among the bone parts 2B constituting the fitting portion 510, each of bone parts 2B (2Bc) that are configured not to contact the fitted portion 520, or the thickness (cross-sectional area) of each of the bone parts 2B constituting the fitting portion 510 may be uniform. When, among the bone parts 2B constituting the fitted portion 520 of the fitted member 52, each of the bone parts 2B (2Bm) that are configured to contact the fitting portion 510 of the fitting member 51 is thicker (i.e., has a larger cross-sectional area) than each of the bone parts 2B (2Bn) constituting a portion of the fitted member 52 other than the fitted portion 520, as in the fitted member 52 in the example illustrated in FIG. 17, among the bone parts 2B constituting the fitted portion 520, each of the bone parts 2B (2Bm) that are configured to contact the fitting portion 510 may be thicker (i.e., have a larger cross-sectional area) than, among the bone parts 2B constituting the fitted portion 520, each of bone parts 2B (2Bo) that are configured not to contact the fitting portion 510, or the thickness (cross-sectional area) of each of the bone parts 2B constituting the fitted portion 520 may be uniform.

The term "contact" is not limited to cases of direct contact without anything in between, but also includes cases of contact through glue in between.

[Seat Pad Manufacturing Method]

Figure 18A:
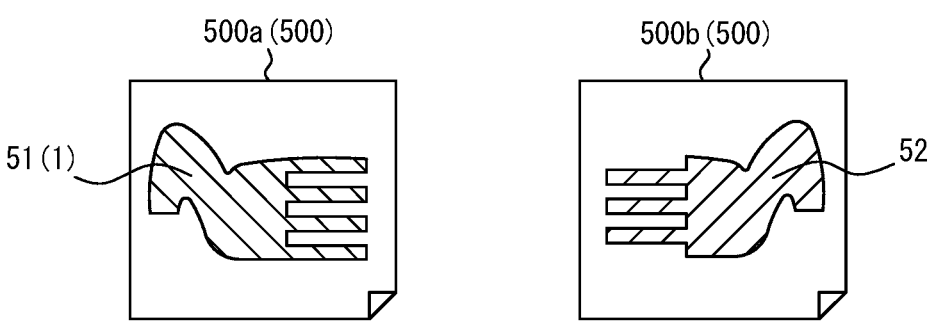
FIGS. 18A-18C are diagrams to explain a seat pad manufacturing method according to an embodiment of the present disclosure that can be used for manufacturing the seat pad according to any embodiment of the present disclosure.
Figure 18B:
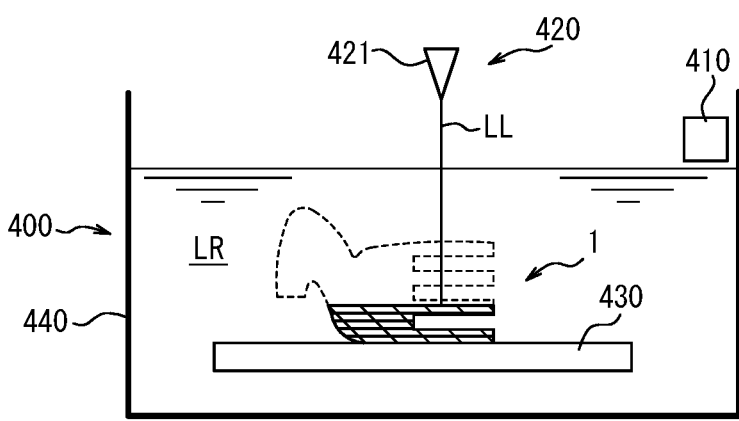
Figure 18C:
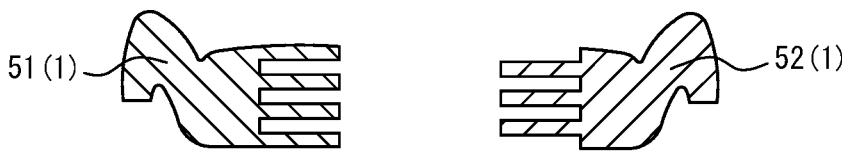

Next, with reference to FIGS. 18A-18C, an embodiment of a seat pad manufacturing method of the present disclosure will be exemplarily described. The method described below can be preferably used to manufacture the seat pad 302 of any embodiment described in this specification.

First, a set of three-dimensional shape data (e.g., three-dimensional CAD data) representing each of the three-dimensional shapes of the fitting member 51 and the fitted member 52 (i.e., the porous structural bodies 1 constituting these members) in the seat pad 302 is generated in advance using a computer (three-dimensional shape data generation step).

In other words, in the three-dimensional shape data generation step, the separate sets of three-dimensional shape data are generated for each of the fitting member 51 and the fitted member 52 (i.e., for each porous structural body 1).

Next, using the computer, each set of three-dimensional shape data described above is converted into 3D shaping data 500 (500a and 500b) (FIG. 18A, 3D shaping data conversion step).

The 3D shaping data 500 is read into a controller 410 of a 3D printer 400 when a shaping unit 420 of the 3D printer 400 performs shaping, and the controller 410 is configured to control the shaping unit 420 to shape an object in the shape represented by the above three-dimensional shape data. The 3D shaping data 500 includes, for example, slice data representing the two-dimensional shape of each layer of the object with the shape represented by the above three-dimensional shape data.

Next, using the 3D printer 400, shaping of the fitting member 51 and the fitted member 52 of the seat pad 302 is performed for each of the fitting member 51 and the fitted member 52 (i.e., for each porous structural body 1) (FIG. 18B, shaping step).

The 3D printer 400 may perform shaping using any shaping method, such as stereolithography, powder sintering lamination, thermal fusion lamination (FDM), or inkjet. From the viewpoint of productivity, the stereolithography is preferable. FIGS. 18A-18C illustrate shaping by stereolithography.

The 3D printer 400 has, for example, the controller 410 constituted of a CPU or the like, the shaping unit 420 that performs shaping under control of the controller 410, a support table 430 on which an object to be shaped (i.e., the above components) is placed, and a housing body 440 in which a liquid resin LR, the support table 430, and the shaped object are contained. In the case of using stereolithography as in this example, the shaping unit 420 has a laser emitter 421 configured to emit an ultraviolet laser beam LL. The housing body 440 is filled with the liquid resin LR. The liquid resin LR is cured by being irradiated with the ultraviolet laser beam LL emitted from the laser emitter 421, and becomes a flexible resin.

In the 3D printer 400 configured as described above, the controller 410 first reads the 3D shaping data 500, and based on the three-dimensional shape included in the read 3D shaping data 500, sequentially shapes each layer while controlling the ultraviolet laser beam LL to be irradiated on the shaping unit 420.

After the shaping by the 3D printer 400 is completed, the shaped object (porous structural body 1) is removed from the housing body 440. The fitting member 51 and the fitted member 52 (i.e., the porous structural bodies 1 constituting the members) are thereby obtained (FIG. 18C).

Thereafter, the fitting portion 510 of the fitting member 51 and the fitted portion 520 of the fitted member 52 are fitted with each other (fitting step). The seat pad 302 is thereby obtained.

In the fitting step, glue may or may not be disposed between the fitting portion 510 and the fitted portion 520.

[Porous Structural Body]

Next, the porous structural body 1 described above will be described in detail with reference to FIGS. 19 to 24. The porous structural body 1 described below can be used in the fitting member 51 and the fitted member 52 of the seat pad 302 according to any embodiment described in this specification. The configuration of the porous structural bodies 1 constituting the fitting member 51 and the fitted member 52 may be the same or different.

In FIGS. 19 to 22, the orientation of an XYZ orthogonal coordinate system fixed to the porous structural body 1 is illustrated to facilitate understanding of the orientation of the porous structural body 1.

Figure 19:
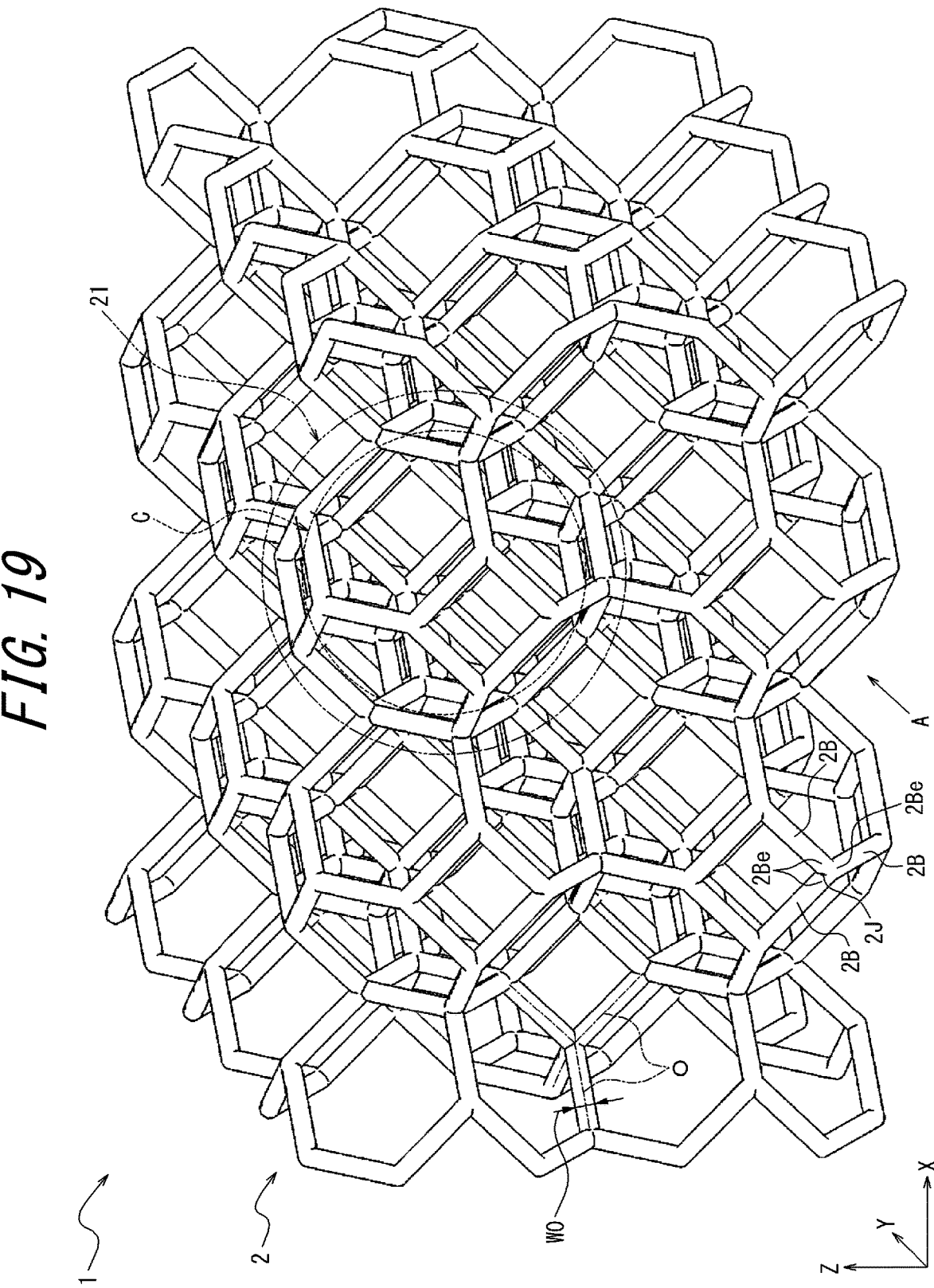
FIG. 19 is a perspective view that illustrates an example of the porous structural body capable of constituting the fitting member and the fitted member of the seat pad according to any embodiment of the present disclosure.

In FIGS. 19 to 20, a portion of the porous structural body 1 with an almost rectangular parallelepiped outline is viewed from different angles. FIG. 19 is a perspective view of the portion of the porous structural body 1. FIG. 20 is an A-arrow view of the portion of the porous structural body 1 of FIG. 19, viewed from the direction of the arrow A (Y direction).

The porous structural body 1 in this example is shaped by a 3D printer. By manufacturing the porous structural body 1 using the 3D printer, compared to a conventional process of foaming by chemical reaction, manufacturing is simplified, and the configuration is obtained as expected. In addition, with future technological advances in 3D printers, it is expected that manufacturing using 3D printers will become possible in the future in shorter time and at lower cost. Moreover, by manufacturing the porous structural body 1 using the 3D printer, the configuration of the porous structural body 1 corresponding to various required properties can be realized easily and as expected.

The porous structural body 1 is, as described above, composed of the flexible resin or rubber.

From the viewpoint of ease of manufacture using the 3D printer, the porous structural body 1 is preferably composed of the flexible resin rather than the rubber.

From the viewpoint of ease of manufacturing by the 3D printer, the entire porous structural body 1 is preferably composed of a material with the same composition. However, the porous structural body 1 may be composed of materials of different compositions depending on parts.

As described above, the porous structural body 1 of this example is shaped by the 3D printer. The entire porous structural body 1 is configured integrally.

The porous structural body 1 is made of the flexible resin or rubber. More specifically, the porous structural body 1 includes the skeleton part 2 that forms a skeleton of the porous structural body 1. The skeleton part 2 zones a number of cell holes C. The skeleton part 2 is present almost over the entire porous structural body 1, and is made of the flexible resin or rubber. In this example, a portion of the porous structural body 1 other than the skeleton part 2 is void space, in other words, the porous structural body 1 consists only of the skeleton part 2.

Figure 21:
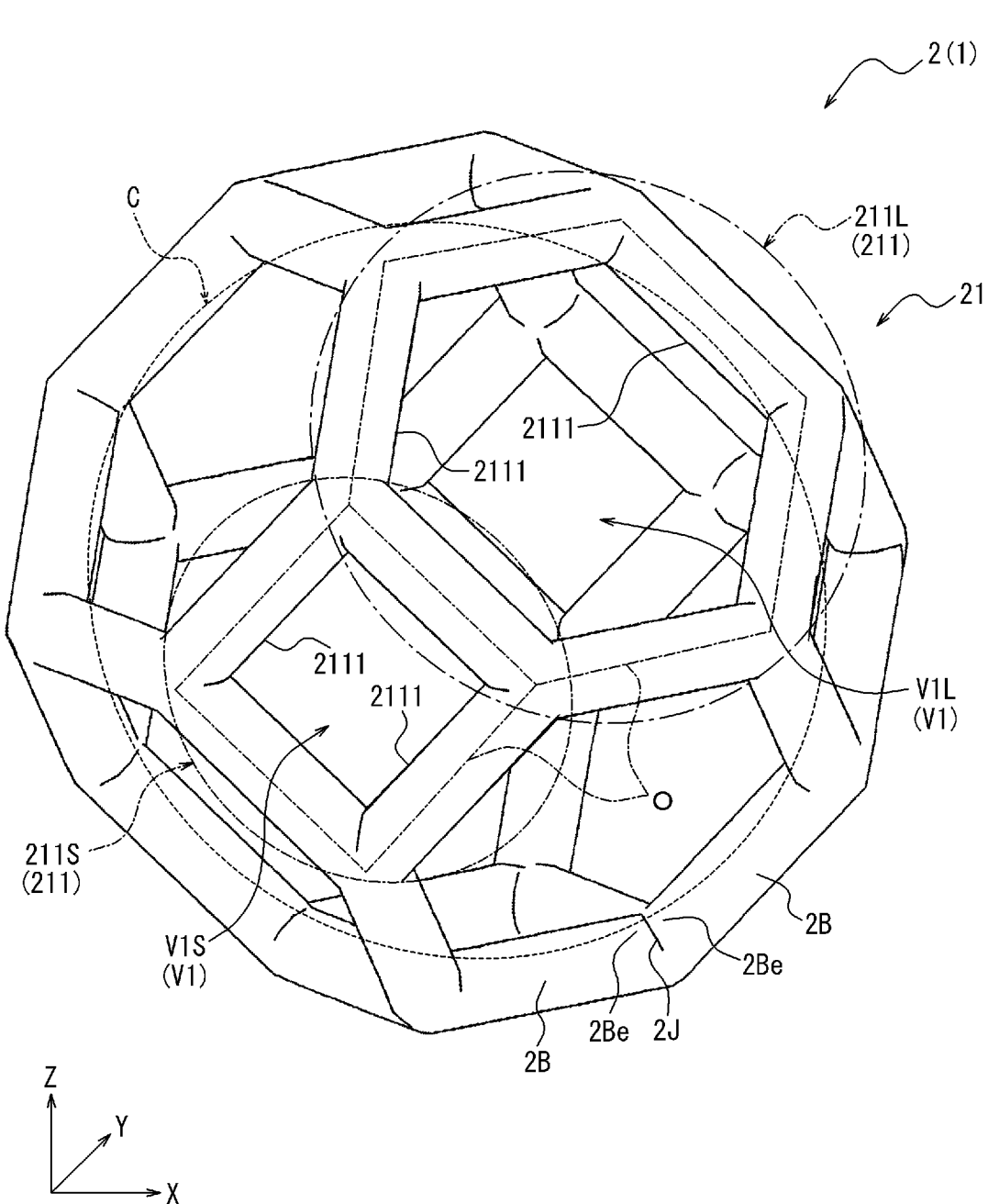
FIG. 21 is a perspective view of a cell zoning part of the porous structural body of FIG. 19.

As illustrated in FIGS. 19 to 21, the skeleton part 2 of the porous structural body 1 includes a plurality of bone parts 2B and a plurality of connection parts 2J, and the entire skeleton part 2 is configured integrally. In this example, each bone part 2B is configured in the shape of a column, and in this example, extends straight. Each connection part 2J connects extension-directional ends 2Be of a plurality (e.g., four) of bone parts 2B, which extend in different directions, to each other, at a point at which the ends 2Be are adjacent to each other.

In FIGS. 19 to 21, in a portion of the porous structural body 1, skeleton lines O of the skeleton part 2 are illustrated by single dotted lines. The skeleton lines O of the skeleton part 2 include skeleton lines O of the bone parts 2B and skeleton lines O of the connection parts 2J. The skeleton lines O of the bone parts 2B are central axial lines of the bone parts 2B. The skeleton line O of the connection part 2J is an extended line portion at which the central axial lines of the bone parts 2B connected by the connection part 2J are smoothly extended into the connection part 2J and coupled to each other. The central axial line of the bone part 2B is a line that connects, at each point in an extension direction of the bone part 2B, the centers of gravity of the shapes formed by the bone part 2B in cross-section perpendicular to the extension direction of the bone part 2B.

The extension direction of the bone part 2B corresponds to an extension direction of the skeleton line O (among the skeleton lines O, a portion corresponding to the bone part 2B; the same applies hereinafter) of the bone part 2B.

Since the porous structural body 1 includes the skeleton part 2 over almost the entirety of the porous structural body 1, the porous structural body 1 is capable of compressing and restoring deformation in response to the application and release of an external force, while ensuring breathability, and thus can have good properties as a seat pad. In addition, the structure of the porous structural body 1 is simplified, which facilitates shaping by the 3D printer.

Among the bone parts 2B constituting the skeleton part 2, some or all of the bone parts 2B may extend while being curved. In such cases, the curvature of the some or all of the bone parts 2B prevents sudden shape changes of the bone parts 2B and thus the porous structural body 1 during load input, thereby suppressing local buckling.

In this example, the bone parts 2B constituting the skeleton part 2 have almost the same shape and length. However, not limited to this example, the shape and/or length of the bone parts 2B constituting the skeleton part 2 may not be the same, and, for example, the shape and/or length of some bone parts 2B may be different from the other bone parts 2B. In this case, the shape and/or length of the bone parts 2B at a particular portion in the skeleton part 2 may differ from those of the bone parts 2B at the other portions to intentionally obtain different mechanical properties.

In this example, the width W0 (FIG. 19) and cross-sectional area of each bone part 2B are constant over the entire length of bone part 2B (i.e., uniform along the extension direction of bone part 2B).

The cross-sectional area of the bone part 2B refers to the cross-sectional area of the bone part 2B in cross-section perpendicular to the skeleton line O. The width W0 (FIG. 19) of the bone part 2B refers to the maximum width of the bone part 2B in cross-section when measured along the cross-section perpendicular to the skeleton line O of the bone part 2B.

However, in each of the examples described in this specification, among the bone parts 2B constituting the skeleton part 2, some or all of the bone parts 2B may have ununiform widths W0 and/or cross-sectional areas of the bone parts 2B along the extension direction of the bone parts 2B. For example, among the bone parts 2B constituting the skeleton part 2, some or all of the bone parts 2B may each have a width W0 gradually increasing or decreasing toward both ends of the bone part 2B in the extension direction, at portions including the ends 2Be on both sides of the bone part 2B in the extension direction. In addition, among the bone parts 2B constituting the skeleton part 2, some or all of the bone parts 2B may each have a cross-sectional area gradually increasing or decreasing toward both ends of the bone part 2B in the extension direction, at the portions including the ends 2Be on both sides of the bone part 2B in the extension direction.

In each of the examples described in this specification, from the viewpoint of simplification of the structure of the skeleton part 2 and thus ease of manufacture of the porous structural body 1 by the 3D printer, the width W0 (FIG. 19) of the bone part 2B is preferably 0.05 mm or more, and more preferably 0.10 mm or more. When the width W0 is 0.05 mm or more, the shaping is possible with the resolution of a high-performance 3D printer, and when the width W0 is 0.10 mm or more, the shaping is possible with the resolution of a general-purpose 3D printer as well as the high-performance 3D printer.

On the other hand, from the viewpoint of improving the accuracy of the shape of an outer edge (outer contour) of the skeleton part 2, reducing a gap (spacing) between the cell holes C, and improving properties as a seat pad, the width W0 of the bone part 2B is preferably 2.0 mm or less.

Although it is preferable that every bone part 2B constituting the skeleton part 2 satisfy these configurations, only some of the bone parts 2B constituting the skeleton part 2 may satisfy these configurations, and even in such cases, the same effects can be obtained, although there may be differences in degree.

In this example, the bone parts 2B constituting the skeleton part 2 are each columnar in shape, and circular (true circle) in cross-sectional shape.

This simplifies the structure of the skeleton part 2 and facilitates shaping using the 3D printer. It is also easier to reproduce the mechanical properties of general polyurethane foam that is manufactured through a process of foaming by chemical reaction. Thus, the properties of the porous structural body 1 as a seat pad can be improved. In addition, by configuring the bone part 2B in a columnar shape, the durability of the skeleton part 2 can be improved compared to the case of replacing the bone part 2B with a thin film portion.

The cross-sectional shape of each bone part 2B is the shape of the bone part 2B in cross-section perpendicular to the central axial line (skeleton line O) of the bone part 2B.

Not limited to this example, among the bone parts 2B constituting the skeleton part 2, only some of the bone parts 2B may satisfy these configurations, and even in such cases, the same effects can be obtained, although there may be differences in degree.

For example, in each of the examples described in this specification, the cross-sectional shape of each of all or some of the bone parts 2B constituting the skeleton part 2 may be polygonal (a regular triangle, a triangle other than a regular triangle, a tetragon, or the like) or circular (oval or the like) other than a perfect circle, and even in such cases, the same effects as in this example can be obtained. The cross-sectional shape of each bone part 2B may be uniform along the extension direction, or may not be uniform along the extension direction. The cross-sectional shape of the bone parts 2B may be different from each other.

In each of the examples described in this specification, the ratio of the volume VB occupied by the skeleton part 2 to the apparent volume VS of the skeleton part 2 ($VB \times 100 / VS$ [%]) is preferably 3 to 10%. This configuration enables a reaction force generated in the skeleton part 2 when an external force is applied to the skeleton part 2, and thus the hardness of the skeleton part 2 (and thus the hardness of the porous structural body 1), to be better as a seat pad (especially as a car seat pad).

Here, the "apparent volume VS of the skeleton part 2" refers to the volume of entire inner space (the sum of the volume occupied by the skeleton part 2, the volume occupied by films 3 (FIG. 22) when the films 3 described below are provided, and the volume of the void space) surrounded by the outer edge (outer contour) of the skeleton part 2.

When the material constituting the skeleton part 2 is considered to be the same, the higher the ratio of the volume VB occupied by the skeleton part 2 to the apparent volume VS of the skeleton part 2, the harder the skeleton part 2 (and thus the porous structural body 1). The lower the ratio of the volume VB occupied by the skeleton part 2 to the apparent volume VS of the skeleton part 2, the softer the skeleton part 2 (and thus the porous structural body 1).

From the viewpoint of making the reaction force generated in the skeleton part 2 when an external force is applied to the skeleton part 2, and thus the hardness of the skeleton part 2 (and thus the porous structural body 1), as a seat pad (especially as a car seat pad), the ratio of the volume VB occupied by the skeleton part 2 to the apparent volume VS of the skeleton part 2 is more preferably 4 to 8% of the apparent volume VS of the skeleton part 2.

Although any method may be used to adjust the ratio of the volume VB occupied by the skeleton part 2 to the apparent volume VS of the skeleton part 2, for example, there are methods of adjusting the thickness (cross-sectional area) of some or all of the bone parts 2B constituting the skeleton part 2 and/or adjusting the size (cross-sectional area) of some or all of the connection parts J constituting the skeleton part 2.

In each of the examples described in this specification, the 25% hardness of the porous structural body 1 is preferably 60 to 500 N, and more preferably 100 to 450 N. The 25% hardness (N) of the porous structural body 1 shall be a measurement value obtained by measuring a load (N) required to compress the porous structural body by 25% in an environment of 23° C. and 50% relative humidity using an Instron-type compression testing machine. This allows the hardness of the porous structural body 1 to be better as a seat pad (especially for a car seat pad).

As illustrated in FIGS. 19 to 21, in this example, the skeleton part 2 has the plurality of cell zoning parts 21 (as many as the number of cell holes C) that zone the cell holes C inside.

FIG. 21 illustrates one cell zoning part 21 alone. The skeleton part 2 in this example has a structure in which a number of cell zoning parts 21 are connected in X, Y, and Z directions.

As illustrated in FIGS. 19 to 21, each cell zoning part 21 has a plurality (in this example, 14) of annular parts 211. Each annular part 211 is configured into an annular shape, and zones a flat virtual surface V1 by its each annular inner peripheral side edge part 2111. The virtual surface V1 is a virtual plane (i.e., a virtual closed plane) zoned by the inner peripheral side edge part 2111 of the annular part 211. The plurality of annular parts 211 constituting the cell zoning part 21 is coupled to each other so that the virtual surfaces V1 zoned by the respective inner peripheral side edge parts 2111 do not intersect with each other.

The cell holes C are zoned by the plurality of annular parts 211 constituting the cell zoning part 21 and the plurality of virtual surfaces V1 zoned by the respective plurality of annular parts 211. Roughly speaking, the annular parts 211 are parts that zone sides of a three-dimensional shape formed by the cell hole C, and the virtual surfaces V1 are parts that zone constituent surfaces of the three-dimensional shape formed by the cell hole C.

Each annular part 211 is constituted of a plurality of bone parts 2B and a plurality of connection parts 2J that connect ends 2Be of the plurality of bone parts 2B to each other.

A coupling part between a pair of annular parts 211 coupled to each other is constituted of one bone part 2B and a pair of connection parts 2J on both sides of the bone part 2B, which are shared by the pair of annular parts 211. That is, each bone part 2B and each connection part 2J are shared by a plurality of annular parts 211 adjacent thereto.

Each virtual surface V1 zones part of one cell hole C by a surface on one side of the virtual surface V1 (a front surface of the virtual surface V1) and zones part of another cell hole C by a surface on the other side of the virtual surface V1 (a back surface of the virtual surface V1). In other words, each virtual surface V1 zones parts of different cell holes C by its front and back surfaces. In other words, each virtual surface V1 is shared by a pair of cell holes C adjacent to the virtual surface V1 (i.e., a pair of cell holes C with the virtual surface V1 in between).

Each annular part 211 is shared by a pair of cell zoning parts 21 adjacent to the annular part 211 (i.e., a pair of cell zoning parts 21 with the annular part 211 in between). In other words, each annular part 211 constitutes part of each of a pair of cell zoning parts 21 adjacent to each other.

In the example of FIGS. 19-20, some of the virtual surfaces V1 in the porous structural body 1 are not covered with films 3 (FIG. 22) described below, but are open, i.e., constitute openings. Therefore, through the virtual surfaces V1, the cell holes C are connected and the breathing between the cell holes C is made possible. This improves the breathability of the skeleton part 2 and facilitates compressing and restoring deformation of the skeleton part 2 in response to the application and release of an external force.

As illustrated in FIG. 21, in this example, the skeleton lines O of each cell zoning part 21 form a polyhedral shape, and whereby each cell hole C has an almost polyhedral shape. More specifically, in the example of FIGS. 19 to 21, the skeleton lines O of each cell zoning part 21 has a Kelvin's tetradecahedral (truncated octahedral) shape, and whereby each cell hole C has almost the Kelvin's tetradecahedral (truncated octahedral) shape. The Kelvin's tetradecahedral (truncated octahedral) shape is a polyhedron consisting of six regular tetragonal constituent faces and eight regular hexagonal constituent faces. The cell holes C constituting the skeleton part 2 are, roughly speaking, arranged in a regular manner so as to fill an inner space enclosed by the outer edge (outer contour) of the skeleton part 2 (i.e., so as to lay out the cell holes C without unnecessary gaps, or in other words, so as to make gaps (spacings) between the cell holes C small).

As in this example, by making the shape of the skeleton lines O of the cell zoning parts 21 in part or the entirety (in this example, entirety) of the skeleton part 2 (and thus the shape of the cell holes C in part or the entirety (in this example, entirety) of the skeleton part 2) polyhedral, it becomes possible to make the gaps (spacings) between the cell holes C constituting the skeleton part 2 smaller and to arrange a more number of cell holes C inside the skeleton part 2. This also allows the behavior of compressing and restoring deformation of the skeleton part 2 (and thus the porous structural body 1) in response to the application and release of an external force to be better as a seat pad (especially a car seat pad).

The polyhedral shape formed by the skeleton lines O of the cell zoning part 21 (and thus the polyhedral shape of the cell hole C) is not limited to this example, but can be arbitrary. For example, the shape of the skeleton lines O of the cell zoning part 21 (and thus the shape of the cell hole C) may be an almost tetrahedron, an almost octahedron, or an almost dodecahedron, which is preferably from the viewpoint of making the gap (spacing) between the cell holes C small. The shape of the skeleton lines O of the cell zoning parts 21 in part or the entirety of the skeleton part 2 (and thus the shape of the cell holes C in part or the entirety of the skeleton part 2) may be a three-dimensional shape (e.g., sphere, ellipse, cylinder, or the like) other than an almost polyhedron. The skeleton part 2 may have only one type of cell zoning parts 21 with the same shape of the skeleton lines O, or may have a plurality of types of cell zoning parts 21 with different shapes of the skeleton lines O. Similarly, the skeleton part 2 may have only one type of cell holes C with the same shape, or may have a plurality of types of cell holes C with different shapes. When the shape of the skeleton lines O of the cell zoning part 21 (and thus the shape of the cell hole C) is almost the Kelvin's tetradeca-hedral (truncated octahedral) shape, as in this example, compared to other shapes, it is possible to reproduce most easily the properties of a seat pad equivalent to those of general polyurethane foam manufactured through a process of foaming by chemical reaction.

As illustrated in FIGS. 19 to 21, in this example, the plurality of (in this example, 14) annular parts 211 consti-tuting the cell zoning part 21 includes one or more (in this example, six) small annular parts 211S and one or more (in this example, eight) large annular parts 211L. Each small annular part 211S zones a flat small virtual surface ViS by its annular inner peripheral side edge part 2111. Each large annular part 211L zones a large virtual surface V1L, which is flat and larger in area than the small virtual surface V1S, by its annular inner peripheral side edge part 2111. Each of the small virtual surface ViS and the large virtual surface V1L is a virtual plane (i.e., virtual closed plane).

As illustrated in FIG. 21, in this example, the skeleton lines O of the large annular part 211L form a regular hexagon in shape, and accordingly, the large virtual surface V1L is also in the shape of a regular hexagon. In this example, the skeleton lines O of the small annular part 211S is a regular tetragon in shape, and accordingly, the small virtual surface ViS is also in the shape of a regular tetragon. Thus, in this example, the small virtual surface ViS and the large virtual surface V1L differ not only in area but also in shape.

Each large annular part 211L is constituted of a plurality (in this example, six) of bone parts 2B and a plurality (in this example, six) of connection parts 2J that connect ends 2Be of the plurality of bone parts 2B. Each small annular part 211S is constituted of a plurality (in this example, four) of bone parts 2B and a plurality (in this example, four) of connection parts 2J that connect ends 2Be of the plurality of bone parts 2B.

In the example of FIGS. 19 to 21, the skeleton lines O of each of the plurality of cell zoning parts 21 constituting the skeleton part 2 form the Kelvin's tetradecahedral (truncated octahedral) shape. As described above, the Kelvin's tetra-decahedral (truncated octahedral) shape is a polyhedron consisting of six regular tetragonal constituent faces and eight regular hexagonal constituent faces. Accordingly, the cell hole C zoned by each cell zoning part 21 also has almost the Kelvin's tetradecahedral shape. The skeleton lines O of the plurality of cell zoning parts 21 constituting the skeleton part 2 are connected to each other in a space-filling manner. In other words, there are no gaps between the skeleton lines O of the plurality of cell zoning parts 21.

Thus, in this example, the skeleton lines O of the plurality of cell zoning parts 21 constituting the skeleton part 2 form a polyhedral shape (in this example, the Kelvin's tetradeca-hedral shape), and accordingly, the cell holes C form almost a polyhedral shape (in this example, the Kelvin's tetradeca-hedral shape), so the gaps (spacings) between the cell holes C constituting the porous structural body 1 can be made more small, and a more number of cell holes C can be formed inside the porous structural body 1. This also results in better behavior of compressing and restoring deformation of the porous structural body 1 in response to the application and release of an external force, as a seat pad (especially for a car seat pad). The gap (spacing) between the cell holes C corresponds to flesh parts (the bone parts 2B and the connection parts 2J) of the skeleton part 2 that zone the cell holes C.

In this example, the skeleton lines O of the plurality of cell zoning parts 21 constituting the skeleton part 2 are con-nected to each other so as to fill a space, so that the gaps (spacings) between the cell holes C constituting the porous structural body 1 can be made smaller. Therefore, the properties of the porous structural body as a seat pad can be improved.

The polyhedrons formed by the skeleton lines O of the cell zoning parts 21 (and thus the almost polyhedrons formed by the cell holes C) are not limited to the example illustrated in the drawings, but can be any arbitrary polyhe-drons.

For example, the polyhedrons formed by the skeleton lines O of the plurality of cell zoning parts 21 constituting the skeleton part 2 (and thus the polyhedrons formed by the cell holes C) can be suitably space-filled (arranged without gaps). This allows the skeleton lines O of the plurality of cell zoning parts 21 constituting the skeleton part 2 to be connected to each other in a space-filling manner, thereby improving the properties of the porous structural body as a seat pad. In this case, the polyhedrons formed by the skeleton lines O of the plurality of cell zoning parts 21 constituting the skeleton part 2 (and thus the almost poly-hedrons formed by the cell holes C) may include only one type of polyhedrons as in this example, or may include a plurality of types of polyhedrons. Here, with respect to polyhedrons, "type" refers to shape (number of constituent faces and shape), and specifically means that two polyhe-drons with different shapes (number and shapes of constitu-ent faces) are treated as two different types of polyhedrons, while two polyhedrons with the same shape but different dimensions are treated as the same type of polyhedrons. When polyhedrons formed by the skeleton lines O of the plurality of cell zoning parts 21 constituting the skeleton part 2 can fill a space and include only one type of polyhedrons, examples of such polyhedrons include a regular triangular prism, regular hexagonal prism, cube, rectangular parallel-epiped, rhombic dodecahedron, and the like, as well as the Kelvin's tetradecahedral shape. As in the example in the drawings, when the shape of the skeleton lines O of the cell zoning part 21 is the Kelvin's tetradecahedral (truncated octahedral) shape, compared to other shapes, it is easiest to reproduce the properties of a seat pad equivalent to a seat pad made of general polyurethane foam produced through a process of foaming by chemical reaction. When the shape of the skeleton lines O of the cell zoning part 21 is the Kelvin's tetradecahedral (truncated octahedral) shape, it is possible to obtain equal mechanical properties in each of the X-Y-Z-directions. When polyhedrons formed by the skeleton lines O of the plurality of cell zoning parts 21 constituting the skeleton part 2 can fill a space and include a plurality of types of polyhedrons, examples of such polyhedrons include a combination of a regular tetrahedron and a regular octahedron, a combination of a regular tetrahedron and a truncated tetrahedron, a combination of a regular octahedron and a truncated hexahedron, and the like. These are examples of combinations of two types of polyhedrons, but combinations of three or more types of polyhedrons are also possible.

The polyhedrons formed by the skeleton lines O of the plurality of cell zoning parts 21 constituting the skeleton part 2 (and thus almost the polyhedrons formed by the cell holes C) can be, for example, any regular polyhedrons (convex polyhedrons whose all faces are regular polygons and in which the number of adjacent faces is equal at all vertexes), semi-regular polyhedrons (among convex polyhedrons whose all faces are regular polygons and all vertex shapes are congruent (the types and order of regular polygons gathered at the vertices are the same), ones other than regular polyhedrons), prisms, pyramids, and the like.

The skeleton lines O of some or all of the plurality of cell zoning parts 21 constituting the skeleton part 2 may form a three-dimensional shape (e.g., sphere, ellipse, cylinder, or the like) other than a polyhedron. By extension, among the plurality of cell holes C constituting the skeleton part 2, some or all of the cell holes C may have almost the three-dimensional shape (e.g., almost sphere, almost ellipse, almost cylinder, or the like) other than almost the polyhedron.

When the plurality of annular parts 211 constituting the cell zoning part 21 include the small annular parts 211S and the large annular parts 211L of different sizes, the gaps (spacings) between the cell holes C constituting the skeleton part 2 can be made smaller. When the shapes of the small annular parts 211S and the large annular parts 211L are different, as in this example, the gaps (spacings) between the cell holes C constituting the skeleton part 2 can be made further smaller.

However, the plurality of annular parts 211 constituting the cell zoning part 21 may be the same in size and/or shape as each other. When the size and shape of the annular parts 211 constituting the cell zoning part 21 are the same, equal mechanical properties can be obtained in each of the X, Y, and Z directions.

As in this example, among the annular parts 211 constituting the cell zoning part 21, the skeleton lines O of some or all (in this example, all) of the annular parts 211 (and thus among the virtual surfaces V1 constituting the cell zoning part 21, some or all (in this example, all) of the virtual surfaces V1) form almost the polygonal shape, so the spacing between the cell holes C constituting the skeleton part 2 can be made small. In addition, the behavior of compressing and restoring deformation of the skeleton part 2 in response to the application and release of an external force becomes more preferable as a seat pad, especially as a car seat pad. In addition, since the shape of the annular parts 211 (and thus the shape of the virtual surfaces V1) is simplified, thus improving productivity and ease of adjustment of the properties. When among the annular parts 211 constituting the skeleton part 2, at least one annular part 211 (and thus among the virtual surfaces V1 constituting the skeleton part 2, at least one virtual surface V1) meets this configuration, the same effects can be obtained, although there may be differences in degree.

Among the annular parts 211 constituting the skeleton part 2, the skeleton lines O of at least one annular part 211 (and thus among the virtual surfaces V1 constituting the skeleton part 2, at least one virtual surface V1) may have any almost polygonal shape other than almost a regular hexagon or almost a regular tetragon as in this example, or any plane shape (e.g., a circle (true circle, ellipse, or the like) other than almost a polygonal shape. When the shape of the skeleton lines O of the annular part 211 (and thus the shape of the virtual surface V1) is a circle (true circle, ellipse, or the like), the shape of the annular part 211 (and thus the shape of the virtual surface V1) is simplified, thus improving productivity and ease of adjustment of the properties, and enabling to obtain more uniform mechanical properties. For example, when the shape of the skeleton lines O of the annular part 211 (and thus the shape of the virtual surface V1) is an ellipse (horizontal ellipse) long approximately perpendicular to the direction in which a load is applied, the annular part 211, and thus the skeleton part 2 (and thus the porous structural body 1) is more easily deformed (becomes softer) in response to load input.

In this example, the skeleton part 2 preferably has at least one cell hole C with a diameter of 5 mm or more. This facilitates manufacturing the porous structural body 1 using the 3D printer. When the diameter of each cell hole C of the skeleton part 2 is less than 5 mm, the structure of the skeleton part 2 becomes too complex, and as a result, it may be difficult to generate three-dimensional shape data (CAD data or the like) representing the three-dimensional shape of the porous structural body 1, or 3D shaping data generated based on such three-dimensional shape data, on a computer.

Since conventional porous structural bodies are manufactured through a process of foaming by chemical reaction, it is not easy to form cell holes C with a diameter of 5 mm or more.

By having the cell holes C with a diameter of 5 mm or more in the skeleton part 2, it becomes easier to improve the breathability and ease of deformation of the skeleton part 2.

From this viewpoint, the diameters of all the cell holes C constituting the skeleton part 2 are preferably 5 mm or more.

The larger the diameter of the cell holes C, the easier the porous structural body 1 can be manufactured using the 3D printer, and the easier the breathability and ease of deformation can be improved. From this viewpoint, in the skeleton part 2, the diameter of at least one cell hole C (preferably all cell holes C) is preferably 8 mm or more, and more preferably 10 mm or more.

On the other hand, when the cell holes C of the skeleton part 2 are too large, it becomes difficult to form an outer edge (outer contour) shape of the skeleton part 2 (and thus the porous structural body 1) neatly (smoothly), and the shape accuracy of the porous structural body 1 may decrease and its appearance may deteriorate. In addition, the properties as a seat pad (especially a car seat pad) may not be sufficiently good. Therefore, from the viewpoint of improving the appearance and the properties as a seat pad (especially a car seat pad), the diameter of at least one cell hole C (preferably all cell holes C) of the skeleton part 2 is preferably less than 30 mm, more preferably 25 mm or less, and even more preferably 20 mm or less.

The more cell holes C in the porous structural body 1 that satisfy the above numerical ranges of diameters, the easier each of the above effects is obtained. From this viewpoint, the diameter of each cell hole C constituting the porous structural body 1 preferably satisfies at least one of the above numerical ranges. Similarly, it is more preferable that the average value of the diameters of the cell holes C constituting the porous structural body 1 satisfy at least one of the above numerical ranges.

The diameter of the cell hole C refers to the diameter of the circumscribed sphere of the cell hole C when the cell hole C has a shape different from a strictly spherical shape, as in this example.

When the cell holes C of the skeleton part 2 are too small, the structure of the skeleton part 2 becomes too complex, and as a result, it may be difficult to generate three-dimensional shape data (CAD data or the like) representing the three-dimensional shape of the porous structural body 1, or 3D shaping data generated based on such three-dimensional shape data, on a computer, so it becomes difficult to manufacture the porous structural body 1 using a 3D printer. From the viewpoint of facilitating manufacturing the porous structural body 1 using the 3D printer, among the cell holes C constituting the skeleton part 2, the diameter of a cell hole C with the smallest diameter is preferably 0.05 mm or more, and more preferably 0.10 mm or more. When the diameter of the cell hole C with the smallest diameter is 0.05 mm or more, the shaping is possible a high-performance 3D printer, and when the diameter of the cell hole C with the smallest diameter is 0.10 mm or more, the shaping is possible with the resolution of a general-purpose 3D printer as well as the high-performance 3D printer.

Figure 22:
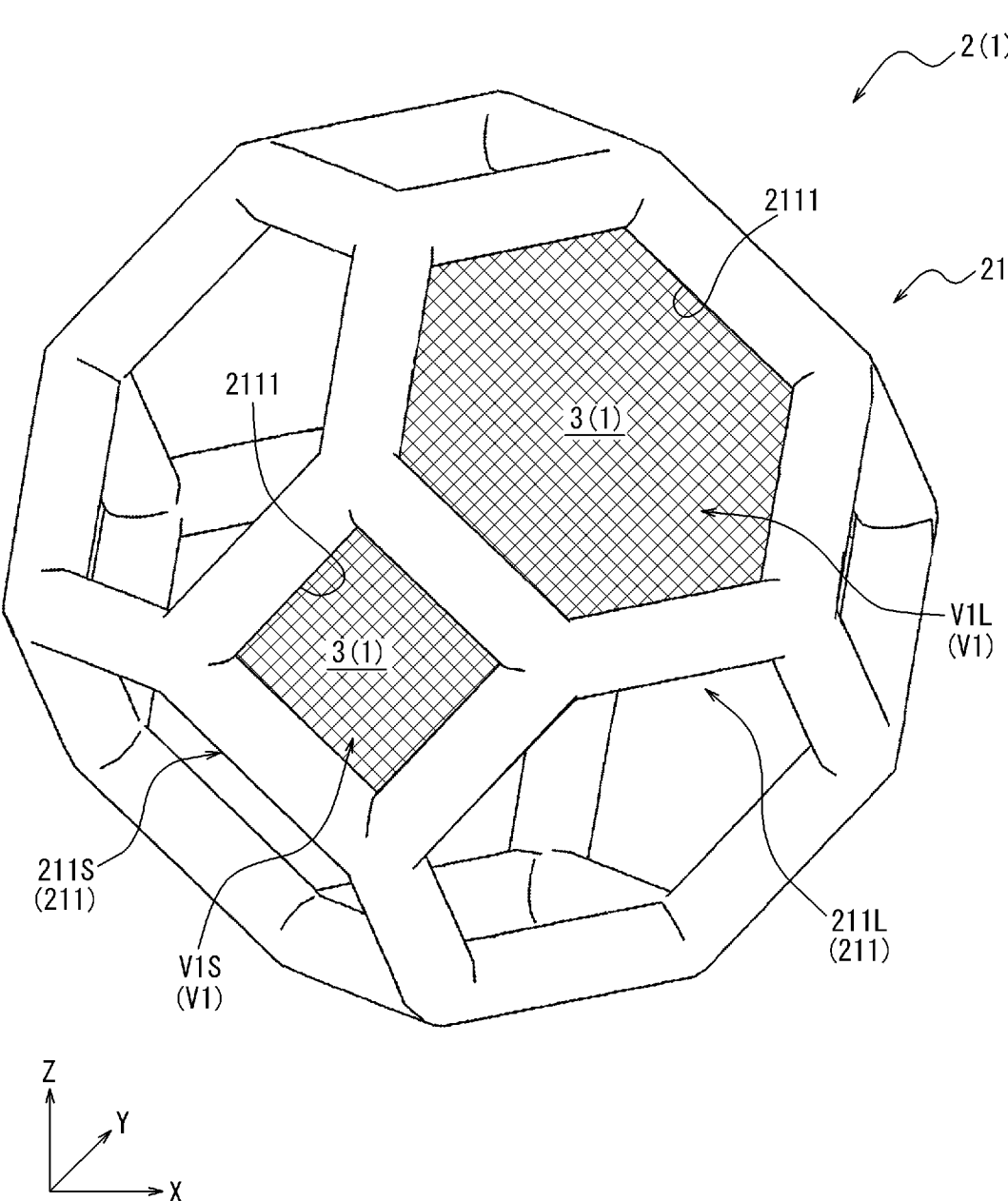
FIG. 22 is a diagram corresponding to FIG. 21, to explain a variation of the cell zoning part.

FIG. 22 is a diagram corresponding to FIG. 21, to explain a variation of the cell zoning parts 21 of the porous structural body 1. In each of the examples described in this specification, as in a variation example illustrated in FIG. 22, the porous structural body 1 may include one or more films 3 in addition to the skeleton part 2.

The film 3 extends over the virtual surface V1 zoned by the annular inner peripheral side edge part 2111 of the annular part 211, thereby covering the virtual surface V1 zoned by the annular part 211. In the porous structural body 1 in the example of FIG. 22, at least one of the virtual surfaces V1 constituting the skeleton part 2 is covered with the film 3. The film 3 is made of the same material as the skeleton part 2 and is constructed integrally with the skeleton part 2. In the example of FIG. 22, the film 3 is constructed flat. However, the film 3 may be constructed non-flat (e.g., curved (curved surface)).

It is preferable that the film 3 have a thickness thinner than the width W0 of the bone part 2B (FIG. 19).

The film 3 prevents the two cell holes C with the virtual surface V1 therebetween from being connected through the virtual surface V1, and thus prevents breathing through the virtual surface V1, which reduces the breathability of the porous structural body 1 as a whole. By adjusting the number of virtual surfaces covered with the films 3, among the virtual surfaces V1 constituting the porous structural body 1, the breathability of the porous structural body 1 as a whole can be adjusted to achieve various levels of breathability according to requirements. From the viewpoint of facilitating compressing and restoring deformation of the porous structural body 1, it is not preferable that all of the virtual surfaces V1 constituting the porous structural body 1 be covered with the films 3, in other words, it is preferable that at least one of the virtual surfaces V1 constituting the porous structural body 1 is open without being covered with the film 3, and it is more preferable that all of the virtual surfaces V1 constituting the porous structural body 1 are open without being covered with the films 3.

As described above, conventional porous structural bodies are manufactured through a process of foaming by chemical reaction, it is difficult to form films in connection holes that connect the cells in expected positions and number. When the porous structural body 1 is manufactured using a 3D printer, as in this example, the 3D shaping data to be loaded into the 3D printer includes information on the films 3 in advance so that the films 3 can be certainly formed in the expected positions and number.

At least one of the small virtual surfaces ViS constituting the skeleton part 2 may be covered with the film 3, and/or at least one of the large virtual surfaces V1L constituting the skeleton part 2 may be covered with the film 3.

Next, with reference to FIGS. 23 to 24, another variation of the porous structural body 1 that can be used in the fitting member 51 and the fitted member 52 of the seat pad 302 according to any embodiment of the present disclosure will be described, focusing on differences from the example in FIGS. 19 to 21.

Figure 23:
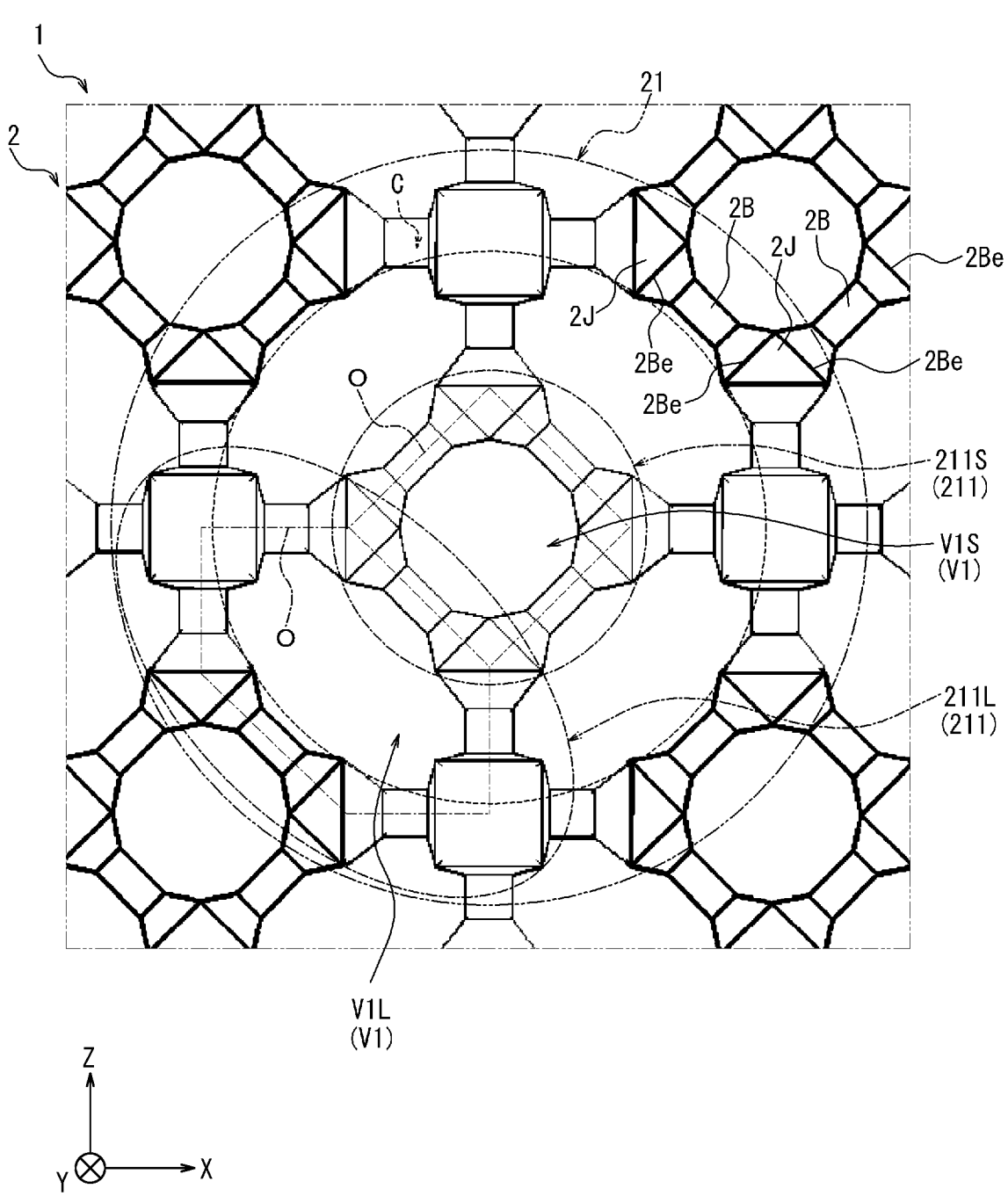
FIG. 23 is a plan view that illustrates another example of the porous structural body capable of constituting the fitting member and the fitted member of the seat pad according to any embodiment of the present disclosure.

In the example of FIGS. 23 to 24, only the configuration of the bone part 2B of the skeleton part 2 of the porous structural body 1 differs from the example of FIGS. 19 to 21.

The porous structural body 1 may or may not have the film 3 (FIG. 22) described above.

In the example of FIG. 23, the skeleton lines O of the plurality of cell zoning parts 21 constituting the skeleton part 2 form the Kelvin's tetradecahedral shape, and accordingly, the cell holes C form almost the Kelvin's tetradecahedral shape. However, as described in the description of the example of FIGS. 19 to 21, in the example of FIG. 23, the skeleton lines O of the plurality of cell zoning parts 21 constituting the skeleton part 2 may form any shape, and accordingly, the cell holes C may also form any shape.

Figure 24A:
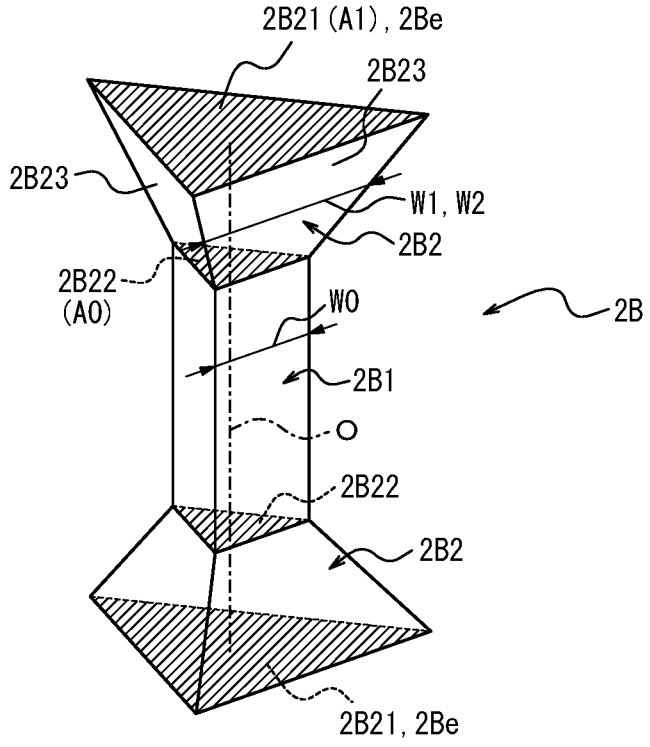
FIG. 24A is a perspective view that illustrates a bone part of the porous structural body of FIG. 23 in a state in which no external force is applied.
Figure 24B:
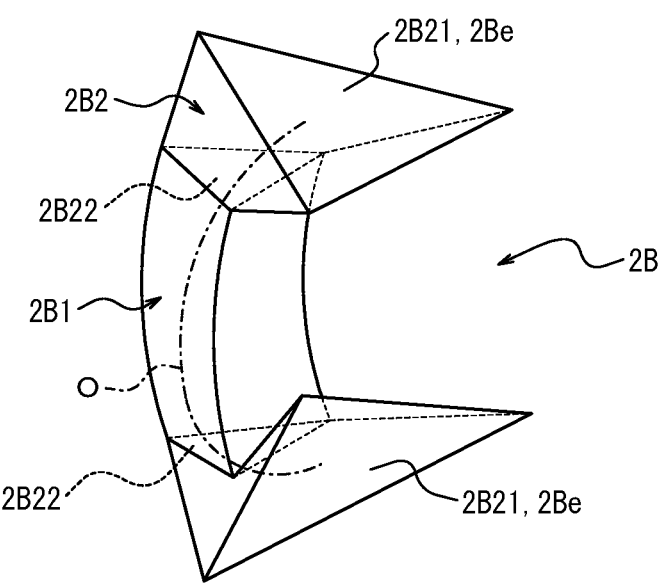
FIG. 24B is a perspective view that illustrates the bone part of FIG. 24A in a state in which an external force is applied.

FIG. 23 is a plan view, which corresponds to FIG. 20, that illustrates another example of the porous structural body 1 that can be used in the fitting member 51 and the fitted member 52 of the seat pad 302 according to any embodiment of the present disclosure. FIGS. 24A-24B illustrate a bone part 2B of this example alone. FIG. 24A illustrates the bone part 2B in a natural state with no external force applied thereto, and FIG. 24B illustrates the bone part 2B with an external force applied thereto. FIG. 23 and FIGS. 24A-24B illustrate central axial lines (skeleton lines O) of bone parts 2B.

As illustrated in FIGS. 23 and 24A, each bone part 2B of the skeleton part 2 includes a bone constant part 2B1 that extends with a constant cross-sectional area, and a pair of bone variable parts 2B2 that extend from the bone constant part 2B1 to the connection parts 2J while gradually varying the cross-sectional area on both sides of the bone constant part 2B1 in its extension direction. In this example, each of the bone variable parts 2B2 extends from the bone constant part 2B1 to the connection part 2J while gradually increasing the cross-sectional area. Not limited to this example, even if only some of the bone parts 2B constituting the skeleton part 2 meet this configuration, the same effects can be obtained. Also, among the bone parts 2B constituting the skeleton part 2, some or all of the bone parts 2B may each have the bone variable part 2B2 only at one end of the bone constant part 2B1, and the other end of the bone constant part 2B1 may be directly connected to the connection part 2J, in which case the same effects can be obtained, although there may be differences in degree.

The cross-sectional areas of the bone constant part 2B1 and the bone variable parts 2B2 refer to the cross-sectional areas of the bone constant part 2B1 and the bone variable parts 2B2 perpendicular to the skeleton lines O.

In this example, since the bone parts 2B constituting the porous structural body 1 each include the bone constant part 2B1 and the bone variable parts 2B2, and the cross-sectional area of the bone variable part 2B2 gradually increases from the bone constant part 2B1 toward the connection part 2J, so the bone part 2B has a narrow shape that tapers toward the bone constant part 2B1 in the vicinity of the boundaries between the bone constant part 2B1 and the bone variable part 2B2. Therefore, when an external force is applied, the bone part 2B tends to buckle at the narrowed portions and a middle portion of the bone constant part 2B1, which in turn tends to compress and deform the porous structural body 1. This results in behavior and properties equivalent to those of general polyurethane foams manufactured through a process of foaming by chemical reaction. This also makes the touch feeling of the surface of the porous structural body 1 softer. Thus, for example, it provides a softer feeling to the seated person when sitting down, especially at the beginning of sitting down. Such a softer feeling is generally and widely preferred, and is also preferred by a seated person of a luxury car seat pad (e.g., a seated person in a rear seat when the person is seated in the rear seat with a driver).

As in this example, when the bone part 2B has the bone constant part 2B1 in at least a portion thereof, the ratio A0/A1 of the cross-sectional area A0 (FIG. 24A) of the bone constant part 2B1 to the cross-sectional area A1 (FIG. 24A) of an end 2B21 on either (preferably both) sides of the bone part 2B preferably meets the following equation.

$$0.15 \leq A0/A1 \leq 2.0$$

This allows the touch feeling of the surface of the porous structural body 1 to be neither too softness nor too hardness, and to have a good hardness as a property of a seat pad (especially a car seat pad). Thus, for example, the seat pad provides a moderately hard feeling to the seated person when the seated person sits down, especially at the beginning of sitting down. The smaller the ratio A0/A1 is, the softer the touch feeling of the surface of the porous structural body 1 becomes. When the ratio A0/A1 is less than 0.15, the touch feeling of the surface of the porous structural body 1 may become too soft, which may be unpreferable as a property of a seat pad (especially a car seat pad), and it may be difficult to manufacture by a 3D printer, which is unpreferable in terms of manufacturability. When the ratio A0/A1 exceeds 2.0, the touch feeling of the surface of the porous structural body 1 may become too hard, which may be unpreferable as a property of a seat pad (especially a car seat pad).

The ratio A0/A1 is more preferably 0.5 or more.

More specifically, in the example of FIGS. 23 to 24, the bone portion 2B has the bone constant part 2B1 and the pair of bone variable parts 2B2 continuous on both sides thereof, and the bone variable parts 2B2 each extend from the bone constant part 2B1 to the connection part 2J while gradually increasing its cross-sectional area, and the ratio A0/A1 is less than 1.0. This allows the touch feeling of the surface of the porous structural body 1 to be relatively soft as a property of a seat pad (especially a car seat pad). Such a soft feeling is generally and widely preferred, and is also preferred by a seated person of a luxury car seat pad (e.g., a seated person in a rear seat when the person is seated in the rear seat with a driver).

The bone parts 2B constituting the skeleton part 2 may meet this configuration, or among the bone parts 2B constituting the skeleton part 2, only some of the bone parts 2B may meet this configuration, and in either case, the same effects can be obtained, although there may be differences in degree.

Instead of the example of FIGS. 23 to 24, the bone variable part 2B2 may extend from the bone constant part

2B1 to the connection part 2J with a gradually decreasing cross-sectional area. In this case, the bone constant part 2B1 has a larger (thicker) cross-sectional area than the bone variable part 2B2. This makes it difficult for the bone constant part 2B1 to deform when an external force is applied, and instead, the bone variable part 2B2 (especially a portion on the side of the connection part 2J) is relatively easy to buckle, which in turn makes it difficult for the porous structural body 1 to compress and deform. This results in a harder touch feeling on the surface of the porous structural body 1, as well as high hardness mechanical properties. Thus, for example, it provides a harder feel to a seated person when the seated person sits down, especially at the beginning of seating. Such a behavior is not easy to obtain with ordinary polyurethane foam produced through a process of foaming by chemical reaction. This configuration can accommodate users who prefer a harder feeling. Such a hard feeling is preferred by a seated person in a seat pad of a sports car, for example, in which quick acceleration/deceleration or lane changes are performed.

When the bone variable part 2B2 extends from the bone constant part 2B1 to the connection part 2J with a gradually decreasing cross-sectional area, the ratio A0/A1 exceeds 1.0.

The bone parts 2B constituting the skeleton part 2 may meet this configuration, or among the bone parts 2B constituting the skeleton part 2, only some of the bone parts 2B may meet this configuration, and in either case, the same effects can be obtained, although there may be differences in degree.

In the example of FIGS. 19 to 21 described above, the bone part 2B consists only of the bone constant part 2B1, without the bone variable part 2B2. In this case, the cross-sectional area of the bone part 2B is constant over its entire length. The touch feeling of the surface of the porous structural body 1 when an external force is applied is of medium hardness. This configuration enables a product to accommodate a user who prefers a medium-hard feeling. In addition, the product can be preferably applied to seat pads for all types of vehicles, such as luxury and sports cars.

In this case, the ratio A0/A1 is 1.0.

The bone parts 2B constituting the skeleton part 2 may meet this configuration, or among the bone parts 2B constituting the skeleton part 2, only some of the bone parts 2B may meet this configuration, and in either case, the same effects can be obtained, although there may be differences in degree.

Returning to the example of FIGS. 23 to 24, in this example, in each of bone parts 2B constituting the skeleton part 2, the cross-sectional area of the bone constant part 2B1 is smaller than that of the bone variable part 2B2 and the connection part 2J. More specifically, the cross-sectional area of the bone constant part 2B1 is smaller than the cross-sectional area of any part of the bone variable part 2B2 and the connection part 2J (except for the boundary between the bone constant part 2B1 and the bone variable part 2B2). In other words, the bone constant part 2B1 has the smallest (thinnest) cross-sectional area in the skeleton part 2. Similar to the above, this makes it easier for the bone constant part 2B1 to deform when an external force is applied, which in turn makes it easier for the porous structural body 1 to compress and deform. This provides a softer touch feeling of the surface of the porous structural body 1.

The cross-sectional area of the connection part 2J refers to the cross-sectional area of the connection part 2J perpendicular to the skeleton line O.

Not limited to this example, among the bone parts 2B constituting the skeleton part 2, only some of the bone parts 2B may meet this configuration, and even in such cases, the same effects can be obtained, although there may be differences in degree.

Similarly, in the example of FIGS. 23 to 24, in each of the bone parts 2B constituting the skeleton part 2, the width of the bone constant part 2B1 is smaller than those of the bone variable part 2B2 and the connection part 2J. More specifically, the width of the bone constant part 2B1 is smaller than the width of any part of the bone variable part 2B2 and the connection part 2J (except for the boundary between the bone constant part 2B1 and the bone variable part 2B2). In other words, the bone constant part 2B1 is the smallest (thinnest) part of the skeleton part 2. This also makes the bone constant part 2B1 easier to deform when an external force is applied, thereby providing a softer touch feeling of the surface of the porous structural body 1.

The widths of the bone constant part 2B1, the bone variable part 2B2, and the connection part 2J refer to the maximum widths of the bone constant part 2B1, the bone variable part 2B2, and the connection part 2J when measured along cross-section perpendicular to the skeleton line O of the bone constant part 2B1, the bone variable part 2B2, and the connection part 2J, respectively, at that cross-section. The skeleton line O of the connection part 2J is a portion of the skeleton line O corresponding to the connection part 2J. FIG. 24A illustrates, for reference, the width W0 of the bone constant part 2B1 and the width W1 of the bone variable part 2B2.

Not limited to this example, among the bone parts 2B constituting the skeleton part 2, only some of the bone parts 2B may satisfy this configuration, and even in such cases, the same effects can be obtained, although there may be differences in degree.

In each of the above examples, from the viewpoint of simplification of the structure of the porous structural body 1, and thus ease of manufacturing by the 3D printer, the width W0 (FIGS. 24A-24B) of the bone constant part 2B1 is preferably 0.05 mm or more, and more preferably 0.10 mm or more. When the width W0 is 0.05 mm or more, the shaping is possible with the resolution of a high-performance 3D printer, and when the width W0 is 0.10 mm or more, the shaping is possible with a general-purpose 3D printer, as well as the high-performance 3D printer.

On the other hand, from the viewpoint of improving the accuracy of the outer edge (outer contour) shape of the porous structural body 1, reducing the gap (spacing) between the cell holes C, and improving the properties as a seat pad, the width W0 (FIGS. 24A-24B) of the bone constant part 2B1 is preferably 0.05 mm or more and 2.0 mm or less.

Although it is preferable that the bone parts 2B constituting the skeleton part 2 meet this configuration, among the bone parts 2B constituting the skeleton part 2, only some of the bone parts 2B may meet this configuration, and even in such cases, the same effects can be obtained, although there may be differences in degree.

As illustrated in FIGS. 24A-24B, in this example, in each of the bone parts 2B constituting the skeleton part 2, the bone variable part 2B2 has one or more (in this example, three) inclined surfaces 2B23 on its side surfaces, and the inclined surfaces 2B23 are inclined (inclined at less than 90°) to an extension direction of the bone variable part 2B2 and has a gradually increasing width W2 from the bone constant part 2B1 to the connection part 2J.

This also makes it easier for the bone part 2B to buckle at a narrowed portion in the vicinity of the boundary between the bone constant part 2B1 and the bone variable part 2B2, and thus makes it easier for the porous structural body 1 to compress and deform when an external force is applied. This provides a softer touch feeling of the surface of the porous structural body 1.

Here, the extension direction of the bone variable part 2B2 is an extension direction of the central axial line (skeleton line O) of the bone variable part 2B2. The width W2 of the inclined surface 2B23 of the bone variable part 2B2 is the width of the inclined surfaces 2B23 when measured along cross-section perpendicular to the skeleton line O of the bone variable part 2B2.

Not limited to this example, among the bone parts 2B constituting the skeleton part 2, only some of the bone parts 2B may meet this configuration, and even in such cases, the same effects can be obtained, although there may be differences in degree.

In the example of FIGS. 23 to 24, each of the skeleton parts 2B constituting the skeleton part 2 is columnar, and the bone constant part 2B1 and the bone variable part 2B2 are regular triangles in their respective cross-sectional shapes.

This simplifies the structure of the porous structural body 1 and facilitates shaping by the 3D printer. It is also easier to reproduce the mechanical properties of general polyurethane foam manufactured through a process of foaming by chemical reaction. Thus, the properties of the porous structural body 1 as a seat pad can be improved. In addition, by configuring the bone parts 2B in a columnar shape, the durability of the porous structural body 1 can be improved compared to the case of replacing the bone parts 2B with thin film portions.

The cross-sectional shapes of the bone constant part 2B1 and the bone variable part 2B2 are the shapes of the bone constant part 2B1 and the bone variable part 2B2, respectively, in cross-section perpendicular to the central axial line (skeleton line O).

Not limited to this example, among the bone parts 2B constituting the skeleton part 2, only some of the bone parts 2B may meet this configuration, and even in such cases, the same effects can be obtained, although there may be differences in degree.

In addition, in all or some of the bone parts 2B among the bone parts 2B constituting the skeleton part 2, the cross-sectional shape of the bone constant parts 2B1 and the bone variable parts 2B2 may be a polygon other than a regular triangle (triangle other than a regular triangle, tetragon, or the like) or a circular shape (perfect circle, oval, or the like), and even in such cases, the same effects as in this example can be obtained. The bone constant parts 2B1 and the bone variation parts 2B2 may have different cross-sectional shapes from each other. Each bone part 2B may have a uniform cross-sectional shape along its extension direction or may have a non-uniform cross-sectional shape along its extension direction. The cross-sectional shapes of the bone parts 2B may differ from each other.

INDUSTRIAL APPLICABILITY

The seat pad and the seat pad manufacturing method according to the present disclosure are preferably used as a set pad for any vehicle, and are, in particular, preferably used as a car seat pad.

REFERENCE SIGNS LIST

300 car seat
302 seat pad
310 cushion pad 320 back pad
3MP main pad portion
3SP side pad portion
3BF back pad facing portion
330 outer skin
340 headrest
FS seated person-side surface (front surface)
SS side surface
BS back surface
TD pad thickness direction
LD pad extension direction
WD pad width direction
51 fitting member
510 fitting portion
52 fitted member
520 fitted portion
FD facing direction
Q, Q1, Q2 convex portion
Qt tip surface
R, R1, R2 concave portion
Rb bottom surface
G glue
1 porous structural body
2 skeleton part
2B, 2Ba, 2Bb, 2Bc, 2Bm, 2Bn, 2Bo bone part
2Be end of bone part
2B1 bone constant part
2B2 bone variable part
2B21 end of bone variable part on side of connection part
2B22 end of bone variable part on side of bone constant part
2B23 inclined surface of bone variable part
2J connection part
21 cell zoning part
211 annular part
211L large annular part
211S small annular part
2111 inner peripheral side edge part of annular part
3 film
C cell hole
O skeleton line
V1 virtual surface
V1L large virtual surface
V1S small virtual surface
400 3D printer
410 controller
420 shaping unit
421 laser emitter
430 support table
440 housing body
LL ultraviolet laser beam
LR liquid resin
500, 500a, 500b 3D shaping data

The invention claimed is:

1. A seat pad comprising:
a fitting member having a fitting portion comprising at least one convex portion and at least one concave portion; and
a fitted member having a fitted portion comprising at least one convex portion and at least one concave portion and configured to be fitted with the fitting portion,
wherein
the fitting member and the fitted member are each constituted of a porous structural body,
the porous structural body comprises a skeleton part made of a flexible resin or rubber and extending over almost entirety of the porous structural body, and the skeleton part comprises:
a plurality of bone parts; and
a plurality of connection parts each configured to connect ends of the plurality of bone parts.
2. The seat pad according to claim 1, wherein the fitting portion and the fitted portion are disposed in a main pad portion of the seat pad.
3. The seat pad according to claim 2, wherein the fitting member and the fitted member face each other in a direction perpendicular to a thickness direction of the seat pad.
4. The seat pad according to claim 2, wherein in cross-section perpendicular to a facing direction of the fitting portion and the fitted portion, the fitting portion and the fitted portion extend over an entire length of the seat pad.
5. The seat pad according to claim 2, wherein
at least one of the fitting portion and the fitted portion has a plurality of the convex portions, and
widths of the plurality of the convex portions are not uniform.
6. The seat pad according to claim 2, wherein
at least one of the fitting portion and the fitted portion has a plurality of the convex portions, and
extension lengths of the plurality of the convex portions are not uniform.
7. The seat pad according to claim 2, wherein
among the bone parts constituting the fitting portion of the fitting member, each of bone parts configured to contact the fitted portion of the fitted member is thicker than each of bone parts constituting a portion of the fitting member other than the fitting portion, and
among the bone parts constituting the fitted portion of the fitted member, each of bone parts configured to contact the fitting portion of the fitting member is thicker than each of bone parts constituting a portion of the fitted member other than the fitted portion.
8. The seat pad according to claim 1, wherein the fitting member and the fitted member face each other in a direction perpendicular to a thickness direction of the seat pad.
9. The seat pad according to claim 8, wherein in cross-section perpendicular to a facing direction of the fitting portion and the fitted portion, the fitting portion and the fitted portion extend over an entire length of the seat pad.
10. The seat pad according to claim 8, wherein
at least one of the fitting portion and the fitted portion has a plurality of the convex portions, and
widths of the plurality of the convex portions are not uniform.
11. The seat pad according to claim 8, wherein
at least one of the fitting portion and the fitted portion has a plurality of the convex portions, and
extension lengths of the plurality of the convex portions are not uniform.
12. The seat pad according to claim 1, wherein in cross-section perpendicular to a facing direction of the fitting portion and the fitted portion, the fitting portion and the fitted portion extend over an entire length of the seat pad.
13. The seat pad according to claim 12, wherein
at least one of the fitting portion and the fitted portion has a plurality of the convex portions, and
extension lengths of the plurality of the convex portions are not uniform.
14. The seat pad according to claim 1, wherein
at least one of the fitting portion and the fitted portion has a plurality of the convex portions, and
widths of the plurality of the convex portions are not uniform.

15. The seat pad according to claim 14, wherein at least one of the fitting portion and the fitted portion has a plurality of the convex portions, and extension lengths of the plurality of the convex portions are not uniform.

16. The seat pad according to claim 1, wherein at least one of the fitting portion and the fitted portion has a plurality of the convex portions, and extension lengths of the plurality of the convex portions are not uniform.

17. The seat pad according to claim 1, wherein among the bone parts constituting the fitting portion of the fitting member, each of bone parts configured to contact the fitted portion of the fitted member is thicker than each of bone parts constituting a portion of the fitting member other than the fitting portion, and among the bone parts constituting the fitted portion of the fitted member, each of bone parts configured to contact the fitting portion of the fitting member is thicker than each of bone parts constituting a portion of the fitted member other than the fitted portion.

18. The seat pad according to claim 1, wherein the seat pad is a car seat pad.

19. The seat pad according to claim 1, wherein the fitting member and the fitted member are shaped by a 3D printer.

20. A seat pad manufacturing method for manufacturing the seat pad according to claim 1, the seat pad manufacturing method comprising:

shaping the fitting member and the fitted member using a 3D printer; and fitting the fitting portion of the fitting member and the fitted portion of the fitted member with each other.

21. The seat pad according to claim 1, wherein the skeleton part defines a plurality of cell holes within the porous structural body.

* * * * *